US012621695B2

(12) United States Patent
Li et al.

(10) Patent No.: US 12,621,695 B2
(45) Date of Patent: May 5, 2026

(54) REFERENCE SIGNAL PROCESSING METHOD, NETWORK DEVICE, AND TERMINAL DEVICE

(71) Applicant: Huawei Technologies Co., Ltd., Shenzhen (CN)

(72) Inventors: Bingzhao Li, Beijing (CN); Xuelong Wang, Shenzhen (CN); Junren Chang, Beijing (CN); Lingshuai Kong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/746,699

(22) Filed: May 17, 2022

(65) Prior Publication Data

US 2022/0279371 A1     Sep. 1, 2022

Related U.S. Application Data

(63) Continuation of application No. 16/563,401, filed on Sep. 6, 2019, now Pat. No. 11,356,877, which is a
(Continued)

(30) Foreign Application Priority Data

Nov. 16, 2017     (CN) .......................... 201711140824.9

(51) Int. Cl.
*H04L 5/00*          (2006.01)
*H04W 24/10*          (2009.01)
(Continued)

(52) U.S. Cl.
CPC ........... *H04W 24/10* (2013.01); *H04L 5/0048* (2013.01); *H04W 72/046* (2013.01); *H04W 72/542* (2023.01)

(58) Field of Classification Search
CPC . H04W 72/046; H04W 72/085; H04W 24/10; H04W 72/542; H04L 5/0048
See application file for complete search history.

(56) References Cited

U.S. PATENT DOCUMENTS 9,237,473 B2 *   1/2016   Kazmi ................... H04W 24/10
2013/0083683 A1   4/2013   Hwang et al.
(Continued)

FOREIGN PATENT DOCUMENTS

CN          1756409 A      4/2006
CN        103460634 A     12/2013
(Continued)

OTHER PUBLICATIONS

Certified English Translation of PCT/CN2017/105402 for Callender et al. (Year: 2017).*
(Continued)

*Primary Examiner* — James P Duffy
(74) *Attorney, Agent, or Firm* — Slater Matsil, LLP

(57) ABSTRACT

A measurement configuration method, includes receiving measurement trigger information comprising event trigger information or periodic measurement configuration information, and one or a combination of the following information: a measurement quantity (M) that needs to be reported and a measurement quantity (T) for triggering a measurement event; and sorting and reporting beams in a cell based on the measurement quantity (M) that needs to be reported or the measurement quantity (T) for triggering a measurement event.

20 Claims, 5 Drawing Sheets

FIG. 4

Related U.S. Application Data continuation of application No. PCT/CN2018/115830, filed on Nov. 16, 2018.

(51) Int. Cl.
H04W 72/044 (2023.01)
H04W 72/542 (2023.01)

(56) References Cited

U.S. PATENT DOCUMENTS

| | | | |
|---|---|---|---|
| 2013/0088983 A1 | 4/2013 | Pragada et al. | |
| 2014/0146782 A1 | 5/2014 | Gerlach et al. | |
| 2015/0304878 A1 | 10/2015 | Wang et al. | |
| 2016/0037916 A1 | 2/2016 | Hermann | |
| 2016/0337916 A1 | 11/2016 | Deenoo et al. | |
| 2017/0006593 A1 | 1/2017 | Liu | |
| 2017/0195998 A1 | 7/2017 | Zhang et al. | |
| 2019/0044689 A1* | 2/2019 | Yiu | H04W 72/23 |
| 2019/0052377 A1* | 2/2019 | Hwang | H04L 5/0035 |
| 2019/0058518 A1 | 2/2019 | Koskela et al. | |
| 2019/0075014 A1 | 3/2019 | Zhou et al. | |
| 2019/0174337 A1 | 6/2019 | Prasad et al. | |
| 2019/0174339 A1 | 6/2019 | Prasad et al. | |
| 2020/0084680 A1 | 3/2020 | Deenoo et al. | |
| 2020/0288337 A1* | 9/2020 | Callender | H04W 24/10 |
| 2020/0313832 A1* | 10/2020 | Kim | H04W 24/10 |
| 2020/0374725 A1* | 11/2020 | Chen | H04L 5/0053 |

FOREIGN PATENT DOCUMENTS

| | | |
|---|---|---|
| CN | 103476045 A | 12/2013 |
| CN | 103688583 A | 3/2014 |
| CN | 104159242 A | 11/2014 |
| CN | 104854898 A | 8/2015 |
| CN | 106411375 A | 2/2017 |
| CN | 107005879 A | 8/2017 |
| EP | 3200498 A1 | 8/2017 |
| RU | 2601194 C2 | 10/2016 |
| WO | 2011013989 A2 | 2/2011 |
| WO | 2012112291 A1 | 8/2012 |
| WO | 2012137153 A1 | 10/2012 |
| WO | 2014153752 A1 | 10/2014 |
| WO | 2015109153 A1 | 7/2015 |

OTHER PUBLICATIONS

3GPP TS 38.133, 3rd Generation Partnership Project; Technical Specification Group Radio Access Network; New Radio(NR); Requirements for support of radio resource management (Release 15), (Nov. 2017), 25 pages, V0.3.0.

3GPP TS 38.300, 3rd Generation Partnership Project; Technical Specification Group Radio Access Network; NR; NR and NG-RAN Overall Description; Stage 2 (Release 15), (Nov. 2017), 60 pages, V1.2.0.

3GPP TS 38.331 V0.1.0 (Oct. 2017), 3rd Generation Partnership Project; Technical Specification Group Radio Access Network; NR; Radio Resource Control (RRC); Protocol specification(Release 15), 42 pages.

Samsung, "Measurement and reporting for beam management", R1-1713594, 3GPP TSG RAN WG1 Meeting #90, Aug. 21-25, 2017, 4 pages, Prague, Czech.

Samsung, "Remaining issues of NR RRM measurement configuration", R2-1709685, 3GPP TSG-RAN WG2 2017 RAN2#99 Meeting, Aug. 21-25, 2017, 5 pages, Berlin, Germany.

"RRM Measurement to Support Bandwidth Parts in NR," Agenda Item: 10.2.3, Source: Samsung, Document for: Discussion & Decision, 3GPP TSG-RAN WG2 NR #99bis Meeting, R2-1711190, Prague, Czech, Oct. 9-13, 2017, 8 pages.

"Further Discussion on Measurement Gap for NR," Agenda Item: 3.5.4, Source: Intel Corporation, Document for: Discussion, 3GPP TSG-RAN WG4 Meeting AH NR#3, R4-1709307, Nagoya, Japan, Sep. 18-21, 2017, 9 pages.

Mediatek Inc: "Further Details on Bandwidth Part Operation in NR," 3GPP Draft; R1-17013978, (Aug. 20, 2017) XP051316770, total: 10 pages.

LG Electronics, "Discussion on intra-frequency measurement for NR," 3GPP TSG-RAN WG4 Meeting NR #2, Qingdao, China, Jun. 27-29, 2017, R4-1706630, total 6 pages.

Huawei, HiSilicon, "Link level simulation assumption for CSI-RS based measurements," 3GPP TSG-RAN WG4 Meeting NR ad-hoc #3, Nagoya, Japan, Sep. 18-21, 2017, R4-1709648, total 7 pages.

* cited by examiner

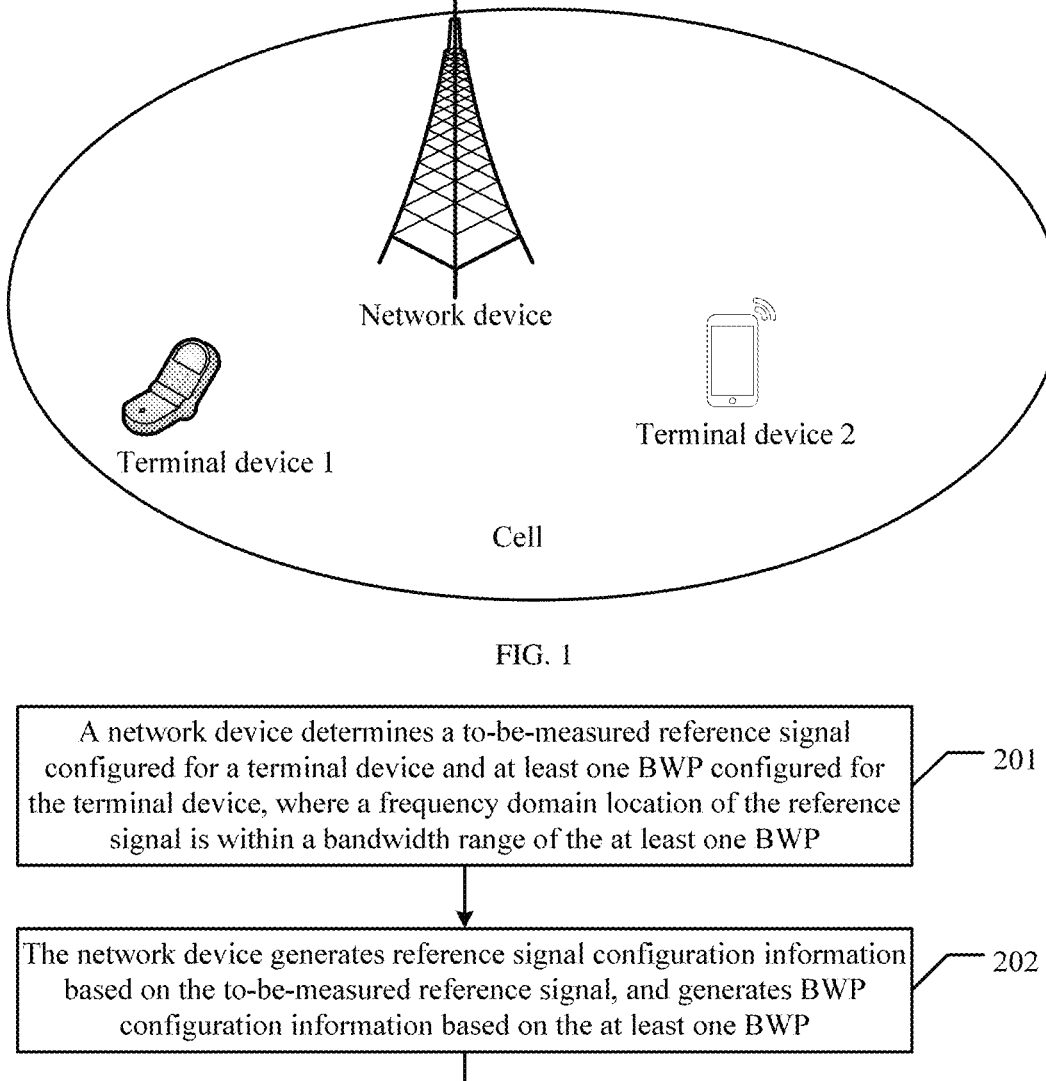

FIG. 1

| A network device determines a to-be-measured reference signal configured for a terminal device and at least one BWP configured for the terminal device, where a frequency domain location of the reference signal is within a bandwidth range of the at least one BWP |
|---|

201

| The network device generates reference signal configuration information based on the to-be-measured reference signal, and generates BWP configuration information based on the at least one BWP |
|---|

202

| The network device sends the reference signal configuration information and the BWP configuration information to the terminal device |
|---|

Gap

UE

REFERENCE SIGNAL PROCESSING METHOD, NETWORK DEVICE, AND TERMINAL DEVICE

CROSS-REFERENCE TO RELATED APPLICATIONS

This application is a continuation of U.S. patent application Ser. No. 16/563,401, filed on Sep. 6, 2019, now U.S. Pat. No. 11,356,877 issued on Jun. 7, 2022, which is a continuation of International Application No. PCT/CN2018/115830, filed on Nov. 16, 2018, which claims priority to Chinese Patent Application No. 201711140824.9, filed on Nov. 16, 2017. All of the afore-mentioned patent applications are hereby incorporated by reference in their entireties.

TECHNICAL FIELD

This application relates to the field of communications technologies, and in particular, to a reference signal processing method, a network device, and a terminal device.

BACKGROUND

Currently, in discussion about a 5th generation (5G) mobile communications technology, there are two types of reference signals: synchronization signals (SS), and channel state information-reference signals (CSI-RS). The SS is a synchronization signal of a cell, and UE may obtain measurement quality of the cell based on measurement of the synchronization signal. The CSI-RS is a reference signal configured for UE, and the UE may also obtain quality of a cell based on measurement of the CSI-RS.

In a 5G system, when a synchronization signal is sent, high-frequency multi-beam transmission needs to be considered. There is a synchronization signal set periodicity for synchronization signal sending. One synchronization signal set periodicity includes a plurality of synchronization signal bursts, and each synchronization signal burst includes a plurality of synchronization signal blocks. When a plurality of beams need to be sent in a cell, one beam may be sent in each synchronization signal block, and all beams are completely sent in one synchronization signal set periodicity.

After a transmit end sends a synchronization signal, UE in an idle mode may perform measurement based on the SS, and UE in a connected mode may also perform measurement based on the SS. In addition to performing the measurement based on the SS, the UE in the connected mode may also perform measurement based on a CSI-RS. However, to measure the CSI-RS, the UE needs to obtain synchronization information of a cell first. Otherwise, it is impossible to learn an occurrence location of the CSI-RS, and measurement of the CSI-RS fails.

In the current system, when user equipment (UE) performs inter-frequency measurement, a measurement gap needs to be configured. In the measurement gap, the following configuration is needed: a current working frequency is in an interrupt state. For UE that does not support working on two frequencies at the same time, if the UE needs to perform measurement on a non-working frequency, a working frequency needs to be interrupted, and then a target frequency is measured within the measurement gap of the UE. For example, the measurement gap may be 6 milliseconds (ms), and an occurrence period may be set to 40 ms, 80 ms, and the like. That is, every 40 ms or 80 ms, the UE can interrupt a current cell for 6 ms, to measure the target frequency. The UE can measure a reference signal of any bandwidth part (BWP) in the measurement gap without being limited by an active BWP.

It can be learned from the foregoing analysis that in the current system, measurement gaps occur periodically, but in each measurement gap, ongoing data receiving and sending of UE need to be interrupted, thereby affecting the data transmission of the UE.

SUMMARY

Embodiments of this application provide a reference signal processing method, a network device, and a terminal device, to optimize measurement technologies.

To resolve the foregoing technical problem, the following technical solutions are provided in the embodiments of this application.

According to a first aspect, an embodiment of this application provides a reference signal processing method, including: determining, by a network device, a to-be-measured reference signal configured for a terminal device and at least one bandwidth part BWP configured for the terminal device, where a frequency domain location of the reference signal is within a bandwidth range of the at least one BWP; generating, by the network device, reference signal configuration information based on the to-be-measured reference signal, and generating BWP configuration information based on the at least one BWP; and sending, by the network device, the reference signal configuration information and the BWP configuration information to the terminal device.

In some embodiments of this application, the network device determines the to-be-measured reference signal configured for the terminal device and the at least one BWP configured for the terminal device, where the frequency domain location of the reference signal is within the bandwidth range of the at least one BWP; the network device generates the reference signal configuration information based on the to-be-measured reference signal, and generates the BWP configuration information based on the at least one BWP; and the network device sends the reference signal configuration information and the BWP configuration information to the terminal device. In this embodiment of this application, the network device may send the reference signal configuration information and the BWP configuration information to the terminal device, so that the terminal device may parse the reference signal configuration information and the BWP configuration information, and obtain quality of a cell based on the reference signal. Therefore, in this embodiment of this application, the reference signal can be measured without starting a measurement gap, thereby reducing activation of the measurement gap and reducing data receiving and sending of the terminal device.

In a possible design of the first aspect of this application, the method further includes: determining, by the network device, a period of a first gap and an offset of the first gap that are configured for the terminal device, where the first gap is used by the network device to send the reference signal; and sending, by the network device, gap configuration information to the terminal device, where the gap configuration information includes the period of the first gap and the offset of the first gap. In this embodiment of this application, the period of the first gap and the offset of the first gap may be used to calculate duration of the first gap each time. After the network device generates the gap configuration information, the network device may further send the gap configuration information to the terminal device, so that the terminal device may receive the gap configuration information from the network device. After parsing the gap configuration information, the terminal device can determine the period and the offset that are configured by the network device for the first gap.

In a possible design of the first aspect of this application, the method further includes: calculating, by the network device, a start time of the first gap based on the period of the first gap and the offset of the first gap; calculating, by the network device, duration of the first gap based on the start time of the first gap and a length of the first gap; determining, by the network device, whether the frequency domain location of the reference signal is within a bandwidth range of an active BWP in the duration of the first gap; and if the frequency domain location of the reference signal is within the bandwidth range of the active BWP in the duration of the first gap, determining, by the network device, to deactivate the first gap. In this embodiment of this application, after the network device determines the duration of the first gap, the network device may determine whether the frequency domain location of the reference signal is within the bandwidth range of the active BWP in the duration of the first gap, and if the frequency domain location of the reference signal is within the bandwidth range of the active BWP in the duration of the first gap, the network device determines to deactivate the first gap. If the first gap is deactivated, the first gap does not need to be restarted, thereby reducing a gap start time.

In a possible design of the first aspect of this application, the reference signal configuration information includes at least one of the following parameters: a type parameter of the reference signal, a period parameter of the reference signal, and a frequency domain location parameter of the reference signal. The type parameter of the reference signal may indicate that the reference signal is an SS or a CSI-RS, the period parameter of the reference signal is used to indicate a sending period of the reference signal, and the frequency domain location parameter of the reference signal is used to indicate a frequency domain location at which the reference signal is sent to the terminal device.

In a possible design of the first aspect of this application, the BWP configuration information includes: frequency information of the at least one BWP and bandwidth information of the at least one BWP. The BWP configured by the network device for the terminal device may be indicated by a frequency and bandwidth of the BWP. Specifically, the network device may configure a BWP set for the terminal device, and the BWP set includes one or more pieces of BWP configuration information. The at least one BWP includes a corresponding reference signal, and the reference signal is an SS or a CSI-RS.

In a possible design of the first aspect of this application, the BWP configuration information includes a correspondence between the reference signal and the at least one BWP. The network device may indicate a correspondence between a reference signal and at least one BWP to the terminal device by using the BWP configuration information. Therefore, the terminal device may determine, based on the BWP configuration information, a reference signal corresponding to each BWP.

In a possible design of the first aspect of this application, the BWP configuration information includes activation time information of the BWP; and the activation time information of the BWP includes at least one of the following parameters: an activation time period of the at least one BWP and an activation time offset of the at least one BWP. An activation time of the BWP occurs based on the activation time period, and the activation time offset is an offset of the activation time of the BWP. The activation time period and the activation time offset may be used to calculate activation duration of the BWP each time.

In a possible design of the first aspect of this application, the method further includes: calculating, by the network device, a start time of the at least one BWP based on the activation time period of the at least one BWP and the activation time offset of the at least one BWP; and determining, by the network device, activation duration of the at least one BWP based on the start time of the at least one BWP and an activation time length of the at least one BWP, where the activation duration of the at least one BWP is used for data transmission between the network device and the terminal device. In this embodiment of this application, the BWP configuration information may further include information about the activation time length of the at least one BWP. The network device may determine the activation duration of the at least one BWP based on the start time of the at least one BWP and the activation time length of the at least one BWP, where the activation duration of the at least one BWP is used for the data transmission between the network device and the terminal device.

According to a second aspect, an embodiment of this application further provides a reference signal processing method, including: obtaining, by a terminal device, reference signal configuration information and bandwidth part BWP configuration information that are sent by a network device; determining, by the terminal device, a to-be-measured reference signal based on the reference signal configuration information, and determining, based on the BWP configuration information, a BWP configured for the terminal device; and obtaining, by the terminal device, quality of a cell based on the reference signal, where the BWP configured for the terminal device belongs to the cell.

In other embodiments of this application, the terminal device obtains the reference signal configuration information and the BWP configuration information that are sent by the network device; the terminal device determines the to-be-measured reference signal based on the reference signal configuration information, and determines, based on the BWP configuration information, the BWP configured for the terminal device; and the terminal device obtains the quality of the cell based on the reference signal, where the BWP configured for the terminal device belongs to the cell. Because the terminal device can parse the reference signal configuration information and the BWP configuration information, the terminal device can obtain the quality of the cell based on the reference signal. Therefore, in this embodiment of this application, the reference signal can be measured without starting a measurement gap, thereby reducing activation of the measurement gap and reducing data receiving and sending of the terminal device.

In a possible design of the second aspect of this application, the method further includes: obtaining, by the terminal device, gap configuration information sent by the network device, where the gap configuration information includes period information of a first gap and offset information of the first gap; and determining, by the terminal device, duration of the first gap based on the period information of the first gap and the offset information of the first gap. The first gap may occur based on a time period, and the offset of the first gap is an offset of an occurrence time of the first gap. The period of the first gap and the offset of the first gap may be used to calculate duration of the first gap each time. The terminal device may receive the gap configuration information from the network device. After parsing the gap configuration information, the terminal device can determine the period and the offset that are configured by the network device for the first gap.

In a possible design of the second aspect of this application, the obtaining, by the terminal device, quality of a cell based on the reference signal includes: determining, by the terminal device, an active BWP, where the active BWP is one or more BWPs in BWPs configured for the terminal device; after the terminal device determines the duration of the first gap, determining, by the terminal device, whether a frequency domain location of the reference signal is within a bandwidth range of the active BWP; and if the frequency domain location of the reference signal is within the bandwidth range of the active BWP, deactivating, by the terminal device, the first gap, and obtaining the quality of the cell based on the reference signal corresponding to the active BWP. The terminal device may first determine the BWP activated by the network device, and then after the terminal device calculates the duration of the first gap by performing the foregoing steps, the terminal device determines whether the frequency domain location of the reference signal is within the bandwidth range of the active BWP. If the frequency domain location of the reference signal is within the bandwidth range of the active BWP, it indicates that the terminal device can obtain, without using the first gap, the quality of the cell corresponding to the reference signal. In this case, the terminal device may deactivate the first gap. In this embodiment of this application, the terminal device may determine the active BWP, thereby reducing a gap start time. Therefore, a data transmission interruption between the network device and the terminal device is reduced.

In a possible design of the second aspect of this application, after the determining, by the terminal device, whether a frequency domain location of the reference signal is within a bandwidth range of the active BWP, the method further includes: if the frequency domain location of the reference signal is not within the bandwidth range of the active BWP, activating, by the terminal device, the first gap, and obtaining the quality of the cell that is in the activated first gap and that corresponds to the reference signal. If the frequency domain location of the reference signal is not within the bandwidth range of the active BWP, it indicates that the reference signal is not within the bandwidth range of the active BWP. In this case, the foregoing first gap is required. After the first gap is activated, the terminal device may obtain the quality of the cell that is in the activated first gap and that corresponds to the reference signal. In this embodiment of this application, the terminal device may activate the first gap, thereby obtaining the quality of the cell in the first gap.

In a possible design of the second aspect of this application, the BWP configuration information further includes activation time information of the BWP, and the activation time information of the BWP includes an activation time period of the BWP configured for the terminal device and an activation time offset of the BWP configured for the terminal device; and the obtaining, by the terminal device, quality of a cell based on the reference signal, includes: determining, by the terminal device based on the activation time period of the BWP configured for the terminal device and the activation time offset of the BWP configured for the terminal device, a start time of the BWP configured for the terminal device; and obtaining, by the terminal device from the start time of the BWP configured for the terminal device, the quality of the cell that is in an activation time length configured for the terminal device and that corresponds to the reference signal.

In a possible design of the second aspect of this application, the activation time length is included in the activation time information of the BWP, or the activation time length is locally configured by the terminal device. The BWP configuration information may further include information about the activation time length of the at least one BWP. The terminal device may determine the activation duration of the at least one BWP based on the start time of the at least one BWP and the activation time length of the at least one BWP, where the activation duration of the at least one BWP is used for data transmission between the terminal device and the network device.

In a possible design of the second aspect of this application, the BWP configuration information further includes: a quantity of BWPs is N, N is greater than or equal to 2, and bandwidth of each of the N BWPs includes a configured to-be-measured reference signal; and the obtaining, by the terminal device, quality of a cell based on the reference signal includes: obtaining, by the terminal device in a measurement period, M sampling results corresponding to a reference signal within a bandwidth range of a BWP activated at a sampling moment, where M is a positive integer; and calculating, by the terminal device, the quality of the cell based on the M sampling results. The terminal device may obtain, in the measurement period, a plurality of sampling results of reference signals corresponding to a plurality of BWPs, and the terminal device may use the sampling results of the plurality of BWPs as the quality of the cell. Therefore, the terminal device can implement measurement of the quality of the cell without starting the gap.

In a possible design of the second aspect of this application, the calculating, by the terminal device, the quality of the cell based on the M sampling results includes: extracting, by the terminal device, H sampling results from the M sampling results, where H is less than M, the H sampling results are sampling results obtained by sampling a reference signal corresponding to a first BWP, and the first BWP is a default BWP or an initial BWP; and calculating, by the terminal device, the quality of the cell based on the H sampling results. The default BWP is a BWP returned by the terminal device within a particular period of time after the data transmission ends, and the initial BWP is a BWP used when the terminal device is in initial access. The quality of the cell, calculated based on the H sampling results corresponding to the default BWP or the initial BWP, can better indicate real signal quality of a serving cell, thereby improving calculation accuracy of the quality of the cell.

According to a third aspect, an embodiment of this application provides a network device, including: a processing module, configured to determine a to-be-measured reference signal configured for a terminal device and at least one bandwidth part BWP configured for the terminal device, where a frequency domain location of the reference signal is within a bandwidth range of the at least one BWP, where the processing module is further configured to generate reference signal configuration information based on the to-be-measured reference signal, and generate BWP configuration information based on the at least one BWP; and a sending module, configured to send the reference signal configuration information and the BWP configuration information to the terminal device.

In a possible design of the third aspect of this application, the processing module is further configured to determine a period of a first gap and an offset of the first gap that are configured for the terminal device, where the first gap is used by the network device to send the reference signal; and the sending module is further configured to send gap configuration information to the terminal device, where the gap configuration information includes the period of the first gap and the offset of the first gap.

In a possible design of the third aspect of this application, the processing module is configured to: calculate a start time of the first gap based on the period of the first gap and the offset of the first gap; calculate duration of the first gap based on the start time of the first gap and a length of the first gap; determine whether the frequency domain location of the reference signal is within a bandwidth range of an active BWP in the duration of the first gap; and if the frequency domain location of the reference signal is within the bandwidth range of the active BWP in the duration of the first gap, determine to deactivate the first gap.

In a possible design of the third aspect of this application, the reference signal configuration information includes at least one of the following parameters: a type parameter of the reference signal, a period parameter of the reference signal, and a frequency domain location parameter of the reference signal.

In a possible design of the third aspect of this application, the BWP configuration information includes: frequency information of the at least one BWP and bandwidth information of the at least one BWP.

In a possible design of the third aspect of this application, the BWP configuration information includes a correspondence between the reference signal and the at least one BWP.

In a possible design of the third aspect of this application, the BWP configuration information includes activation time information of the BWP; and the activation time information of the BWP includes at least one of the following parameters: an activation time period of the at least one BWP and an activation time offset of the at least one BWP.

In a possible design of the third aspect of this application, the processing module is further configured to calculate a start time of the at least one BWP based on the activation time period of the at least one BWP and the activation time offset of the at least one BWP; and the processing module is further configured to determine activation duration of the at least one BWP based on the start time of the at least one BWP and an activation time length of the at least one BWP, where the activation duration of the at least one BWP is used for data transmission between the network device and the terminal device.

In the third aspect of this application, the component modules of the network device may also perform the steps described in the first aspect and various possible designs. For details, refer to descriptions in the first aspect and the various possible designs.

According to a fourth aspect, an embodiment of this application further provides a terminal device. The terminal device includes: a receiving module, configured to obtain reference signal configuration information and bandwidth part BWP configuration information that are sent by a network device; and a processing module, configured to determine a to-be-measured reference signal based on the reference signal configuration information, and determine, based on the BWP configuration information, a BWP configured for the terminal device, where the processing module is configured to obtain quality of a cell based on the reference signal, where the BWP configured for the terminal device belongs to the cell.

In a possible design of the fourth aspect of this application, the receiving module is further configured to obtain gap configuration information sent by the network device, where the gap configuration information includes period information of a first gap and offset information of the first gap; and the processing module is further configured to determine duration of the first gap based on the period information of the first gap and the offset information of the first gap.

In a possible design of the fourth aspect of this application, the processing module is configured to: determine an active BWP, where the active BWP is one or more BWPs in BWPs configured for the terminal device; after the terminal device determines the duration of the first gap, determine whether a frequency domain location of the reference signal is within a bandwidth range of the active BWP; and if the frequency domain location of the reference signal is within the bandwidth range of the active BWP, deactivate the first gap, and obtain the quality of the cell based on the reference signal corresponding to the active BWP.

In a possible design of the fourth aspect of this application, after determining whether the frequency domain location of the reference signal is within the bandwidth range of the active BWP, the processing module is configured to: if the frequency domain location of the reference signal is not within the bandwidth range of the active BWP, activate the first gap; and obtain the quality of the cell that is in the activated first gap and that corresponds to the reference signal.

In a possible design of the fourth aspect of this application, the BWP configuration information further includes activation time information of the BWP, and the activation time information of the BWP includes an activation time period of the BWP configured for the terminal device and an activation time offset of the BWP configured for the terminal device; and the processing module is configured to: determine, based on the activation time period of the BWP configured for the terminal device and the activation time offset of the BWP configured for the terminal device, a start time of the BWP configured for the terminal device; and obtain, from the start time of the BWP configured for the terminal device, the quality of the cell that is in an activation time length configured for the terminal device and that corresponds to the reference signal.

In a possible design of the fourth aspect of this application, the activation time length is included in the activation time information of the BWP, or the activation time length is locally configured by the terminal device.

In a possible design of the fourth aspect of this application, the BWP configuration information further includes: a quantity of BWPs is N, N is greater than or equal to 2, and bandwidth of each of the N BWPs includes a configured to-be-measured reference signal; the processing module is specifically configured to: obtain, in a measurement period, M sampling results corresponding to a reference signal within a bandwidth range of a BWP activated at a sampling moment, where M is a positive integer; and calculate the quality of the cell based on the M sampling results.

In a possible design of the fourth aspect of this application, the processing module is configured to: extract H sampling results from the M sampling results, where H is less than M, the H sampling results are sampling results obtained by sampling a reference signal corresponding to a first BWP, and the first BWP is a default BWP or an initial BWP; and calculate the quality of the cell based on the H sampling results.

In the fourth aspect of this application, the component modules of the terminal device may also perform the steps described in the second aspect and various possible designs. For details, refer to descriptions in the second aspect and the various possible designs.

According to a fifth aspect, an embodiment of this application provides a network device. The network device includes: a processor and a memory, where the memory is configured to store an instruction; and the processor is configured to execute the instruction in the memory, so that the network device performs the method according to any one of the first aspect or the possible designs of the first aspect.

According to a sixth aspect, an embodiment of this application provides a terminal device. The terminal device includes: a processor and a memory, where the memory is configured to store an instruction; and the processor is configured to execute the instruction in the memory, so that the terminal device performs the method according to any one of the second aspect or the possible designs of the second aspect.

According to a seventh aspect, this application provides a chip system. The chip system includes a processor, configured to support a network device or a terminal device in implementing functions in the foregoing aspects, for example, to send or process data and/or information in the foregoing methods. In a possible design, the chip system further includes a memory, and the memory is configured to store a program instruction and data that are necessary for the network device or the terminal device. The chip system may include a chip, or may include a chip and another discrete device.

According to an eighth aspect, this application provides a computer readable storage medium. The computer readable storage medium stores an instruction. When the instruction runs on a computer, the computer performs the methods described in the foregoing aspects.

According to a ninth aspect, this application provides a computer program product including an instruction. When the instruction runs on a computer, the computer performs the methods described in the foregoing aspects.

BRIEF DESCRIPTION OF THE DRAWINGS

FIG. 1 is a schematic architectural diagram of a system to which a reference signal processing method is applied according to an embodiment of this application;

FIG. 2 is a schematic block flowchart of a reference signal processing method according to an embodiment of this application;

DETAILED DESCRIPTION OF ILLUSTRATIVE EMBODIMENTS

Figure 3:
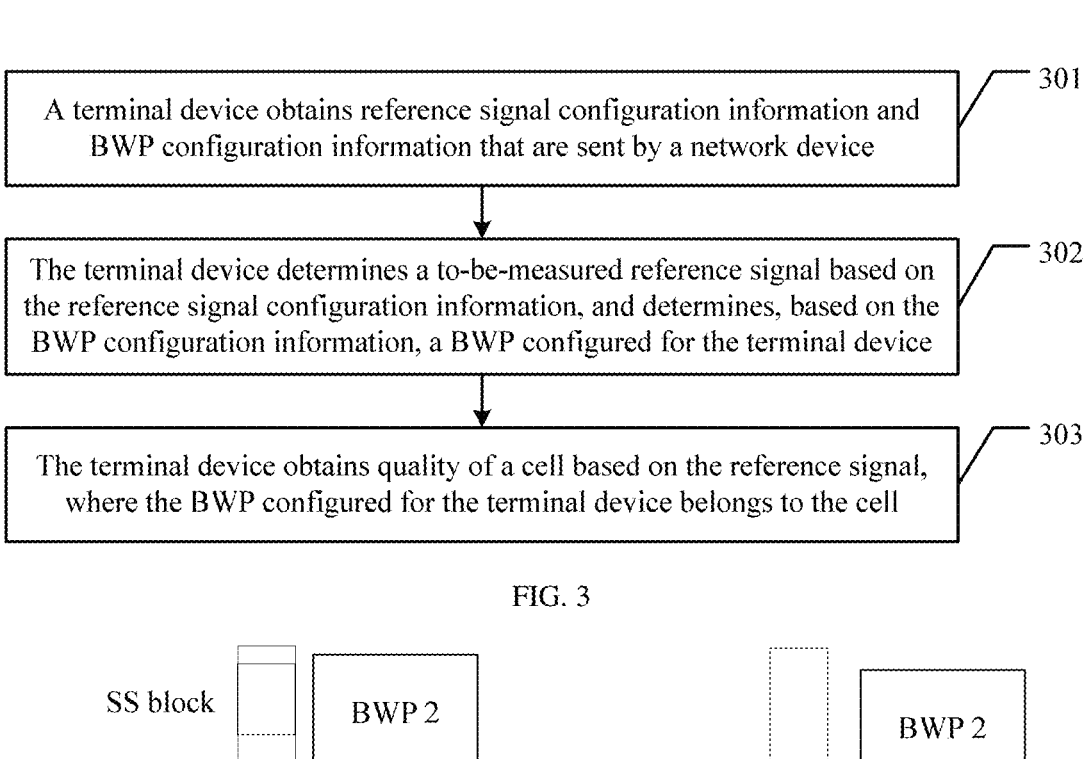
FIG. 3 is a schematic block flowchart of another reference signal processing method according to an embodiment of this application.

Embodiments of this application provide a reference signal processing method, a network device, and a terminal device, to optimize measurement technologies.

The following describes the embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover a non-exclusive inclusion, so that a process, method, system, product, or device that includes a series of units is not necessarily limited to those units, but may include other units not expressly listed or inherent to such a process, method, system, product, or device.

Technologies described in this application may be applied to a long term evolution (LTE for short) system, or another wireless communications system using various radio access technologies, for example, a system using an access technology such as code division multiple access, frequency division multiple access, time division multiple access, orthogonal frequency division multiple access, or single carrier frequency division multiple access. In addition, the technologies may be further applied to a subsequent evolved system of the LTE system, such as a 5th generation (5G) system, including a new radio (NR) system, an evolved LTE system, or the like.

FIG. 1 is a schematic structural diagram of a system according to an embodiment of this application. The system may include a network device and a terminal device, where there may be one or more terminal devices. The terminal device in this application may include a handheld device, an in-vehicle device, a wearable device, or a computing device that provides a wireless communication function; another processing device connected to a wireless modem; or user equipment (UE) in various forms, including a mobile station (MS), a terminal, a terminal device, and the like. For ease of description, in this application, the devices mentioned above are collectively referred to as user equipment or UE. The network device in this application may include a base station (BS), and the network device is an apparatus deployed in a radio access network to provide the UE with a wireless communication function. The base station may include a macro base station, a micro base station, a relay station, an access point, and the like in various forms. In systems that use different radio access technologies, a device having a base station function may have different names. For example, the device is referred to as an evolved NodeB (eNB or eNodeB) in an LTE system, referred to as a gNB in an NR system, referred to as a NodeB in a 3rd generation 3G system, or the like.

The following provides examples to describe a reference signal processing method from the perspective of a network device and a terminal device respectively. First, description is made from the perspective of the network device. FIG. 2 shows an embodiment of a reference signal processing method in this application. The method may include the following steps.

201. The network device determines a to-be-measured reference signal configured for the terminal device and at least one BWP configured for the terminal device, where a frequency domain location of the reference signal is within a bandwidth range of the at least one BWP.

In this embodiment of this application, the network device may configure the reference signal for the terminal device, where the reference signal specifically includes: a synchronization signal (SS) or a channel state information-reference symbol (CSI-RS). The SS is a synchronization signal of a cell, and UE may obtain measurement quality of the cell based on measurement of the synchronization signal. The CSI-RS is a reference signal configured for UE, and the UE may alternatively obtain quality of a cell based on measurement of the CSI-RS. In addition to configuring the reference signal for the terminal device, the network device may configure at least one BWP for the terminal device. For example, the network device may configure one BWP for the terminal device, or the network device configures a plurality of BWPs for the terminal device.

A BWP may be a part of bandwidth of a cell, and the network device may perform such configuration that the terminal device works on the at least one BWP, at least one of the at least one BWP is active, and the active BWP may be used for data transmission between the network device and the terminal device.

In this embodiment of this application, the network device determines the reference signal and the at least one BWP for the terminal device, where the frequency domain location of the reference signal is within the bandwidth range of the at least one BWP. In other words, the bandwidth range of the at least one BWP includes a sending frequency domain location of the reference signal.

202. The network device generates reference signal configuration information based on the to-be-measured reference signal, and generates BWP configuration information based on the at least one BWP.

In this embodiment of this application, after the network device determines the reference signal and the at least one BWP for the terminal device, the network device may generate the reference signal configuration information based on the determined reference signal, where the reference signal configuration information includes information about the reference signal configured by the network device for the terminal device. The network device may further generate the BWP configuration information based on the determined at least one BWP, where the BWP configuration information includes information of the BWP configured by the network device for the terminal device.

In some embodiments of this application, the reference signal configuration information generated by the network device for the terminal device includes at least one of the following parameters: a type parameter of the reference signal, a period parameter of the reference signal, and a frequency domain location parameter of the reference signal. The type parameter of the reference signal may indicate that the reference signal is an SS or a CSI-RS, the period parameter of the reference signal is used to indicate a sending period of the reference signal, and the frequency domain location parameter of the reference signal is used to indicate a frequency domain location at which the reference signal is sent to the terminal device.

In some embodiments of this application, the BWP configuration information generated by the network device for the terminal device includes: frequency information of the at least one BWP and bandwidth information of the at least one BWP. The BWP configured by the network device for the terminal device may be indicated by a frequency and bandwidth of the BWP. Specifically, the network device may configure a BWP set for the terminal device, and the BWP set includes one or more pieces of BWP configuration information. The at least one BWP includes a corresponding reference signal, and the reference signal is an SS or a CSI-RS.

Further, in some embodiments of this application, the BWP configuration information generated by the network device includes a correspondence between the reference signal and the at least one BWP. The network device may indicate a correspondence between a reference signal and at least one BWP to the terminal device by using the BWP configuration information. Therefore, the terminal device may determine, based on the BWP configuration information, a reference signal corresponding to each BWP.

In this embodiment of this application, it can be learned based on the foregoing description of the BWP that after the network device configures the BWP for the terminal device, the network device needs to activate one or more BWPs, so that the activated BWP can be used for data transmission between the network device and the terminal device. In some embodiments of this application, the BWP configuration information generated by the network device may further include activation time information of the BWP. The activation time information of the BWP may include at least one of the following parameters: an activation time period of the at least one BWP and an activation time offset of the at least one BWP. An activation time of the BWP occurs based on the activation time period, and the activation time offset is an offset of the activation time of the BWP. The activation time period and the activation time offset may be used to calculate activation duration of the BWP each time.

203. The network device sends the reference signal configuration information and the BWP configuration information to the terminal device.

In this embodiment of this application, after the network device generates the reference signal configuration information and the BWP configuration information for the terminal device in the foregoing step 202, the network device may send the reference signal configuration information and the BWP configuration information to the terminal device, so that the terminal device may receive the reference signal configuration information and the BWP configuration information from the network device. After parsing the reference signal configuration information and the BWP configuration information, the terminal device can determine content of the reference signal and content of the BWP that are configured by the network device. The network device may add the reference signal configuration information and the BWP configuration information to same control signaling, and send the control signaling to the terminal device. Alternatively, the network device may add the reference signal configuration information and the BWP configuration information to two different pieces of control signaling respectively, and send the control signaling to the terminal device. No limitation is imposed herein. The control signaling used by the network device may be higher layer signaling.

In some embodiments of this application, in addition to performing the foregoing steps, the reference signal processing method provided in this embodiment of this application may include the following steps configuring, by the network device, a period of a first gap and an offset of the first gap for the terminal device, where the first gap is used by the network device to send the reference signal; and sending, by the network device, gap configuration information to the terminal device, where the gap configuration information includes the period of the first gap and the offset of the first gap.

The network device may further configure the first gap used by the network device to send the reference signal, where the first gap may be a gap that occurs periodically. The network device may configure the period of the first gap and the offset of the first gap. The first gap may occur based on a time period, and the offset of the first gap is an offset of an occurrence time of the first gap. The period of the first gap and the offset of the first gap may be used to calculate duration of the first gap each time. After the network device generates the gap configuration information, the network device may further send the gap configuration information to the terminal device, so that the terminal device may receive the gap configuration information from the network device. After parsing the gap configuration information, the terminal device can determine the period and the offset that are configured by the network device for the first gap.

In some embodiments of this application, in addition to performing the foregoing steps, the reference signal processing method provided in this embodiment of this application may include the following steps: calculating, by the network device, a start time of the first gap (English: GAP) based on the period of the first gap and the offset of the first gap; calculating, by the network device, duration of the first gap based on the start time of the first gap and a length of the first gap; determining, by the network device, whether the frequency domain location of the reference signal is within a bandwidth range of an active BWP in the duration of the first gap; and if the frequency domain location of the reference signal is within the bandwidth range of the active BWP in the duration of the first gap, determining, by the network device, to deactivate the first gap.

The deactivating the first gap may include: skipping starting, in the duration corresponding to the first gap, an operation performed by the terminal device during the measurement gap, and normally performing a data receiving and sending operation on a current serving cell.

The first gap occurs periodically, and the period and the offset of the first gap can be used together to calculate time information of the first gap. Specifically, the time information of the first gap may be directly calculated according to the following formula:

$$\text{SFN1 mod } T1 = \text{FLOOR(gapOffset/10)} \qquad \text{(Formula 1)}$$

A frame that satisfies the system frame number (System Frame Number, SFN) 1 in formula 1 may be determined as a frame of the first gap. In formula 1, SFN represents a frame number at which a measurement gap starts. Because the time information of the first gap is calculated, SFN 1 represents a start frame number of the first gap. T1 represents a period of the first gap, gapOffset represents an offset of the first gap, FLOOR( ) represents a round-down operation, and mod represents a modulo operation, that is, a remainder operation. Formula 1 is used to calculate the start frame number of the first gap. To make a calculation result more accurate to obtain a location of a start subframe, the following formula may also be used in this embodiment of this application:

$$\text{Subframe1} = \text{gapOffset mod 10} \qquad \text{(Formula 2)}$$

In formula 2, subframe 1 represents a start subframe number of the first gap. Therefore, by using formula 1 and formula 2, the network device may calculate the start frame number and subframe numbers of the first gap, thereby determining the start time of the first gap more accurately.

After the start time of the first gap is obtained, the network device may further calculate the duration of the first gap based on the start time of the first gap and the length of the first gap. For example, the network device determines the duration of the first gap based on the start time of the first gap and the time length of the first gap, where the length of the first gap may be a fixed length, for example, 6 milliseconds (ms), or a length configured by the network device, for example, 3 ms.

In some embodiments of this application, after the network device determines the duration of the first gap, the network device may determine whether the frequency domain location of the reference signal is within the bandwidth range of the active BWP in the duration of the first gap, and if the frequency domain location of the reference signal is within the bandwidth range of the active BWP in the duration of the first gap, the network device determines to deactivate the first gap. If the first gap is deactivated, the first gap does not need to be restarted, thereby reducing a gap start time.

In some embodiments of this application, in addition to performing the foregoing steps, the reference signal processing method provided in this embodiment of this application may include the following steps: calculating, by the network device, a start time of the at least one BWP based on the activation time period of the at least one BWP and the activation time offset of the at least one BWP; and determining, by the network device, activation duration of the at least one BWP based on the start time of the at least one BWP and an activation time length of the at least one BWP, where the activation duration of the at least one BWP is used for data transmission between the network device and the terminal device.

The network device may also activate the BWP for the terminal device, and the network device sends the activation time information of the BWP to the terminal device. The activation time information of the BWP may include at least one of the following parameters: an activation time period of the at least one BWP and an activation time offset of the at least one BWP. An activation time of the at least one BWP occurs periodically, and the activation time period and the activation time offset can be used together to calculate the activation time of the at least one BWP. Specifically, a start time of the activation time may be calculated according to the following formula 3:

$$\text{SFN2 mod } T2 = \text{FLOOR(timeoffset/10)} \qquad \text{(Formula 3)}$$

In formula 3, a frame in which the activation time of the BWP occurs can be determined by using SFN 2. In formula 3, SFN 2 represents the start frame number of the activation time, T2 represents the activation time period, the activation time offset is represented by timeoffset, FLOOR( ) represents a round-down operation, and mod represents a modulo operation, that is, a remainder operation. Formula 3 is used to calculate the start frame number of the activation time. To make a calculation result more accurate to obtain a location of a start subframe, the following formula 4 may also be used in this embodiment of this application:

$$\text{Subframe2} = \text{timeoffset mod 10} \qquad \text{(Formula 4)}$$

In formula 4, subframe 2 represents a start subframe number of the activation time of the BWP. Therefore, by using formula 3 and formula 4, the start frame number and the start subframe number that are of the activation time of the BWP can be calculated, thereby determining activation time information of the BWP more accurately.

In some embodiments of this application, the BWP configuration information may further include information about the activation time length of the at least one BWP. The network device may determine the activation duration of the at least one BWP based on the start time of the at least one BWP and the activation time length of the at least one BWP, where the activation duration of the at least one BWP is used for the data transmission between the network device and the terminal device.

It can be learned from description of examples in this application in the foregoing embodiments that the network device determines the to-be-measured reference signal configured for the terminal device and the at least one BWP configured for the terminal device, where the frequency domain location of the reference signal is within the bandwidth range of the at least one BWP; the network device generates the reference signal configuration information based on the to-be-measured reference signal, and generates the BWP configuration information based on the at least one BWP; and the network device sends the reference signal configuration information and the BWP configuration information to the terminal device. In this embodiment of this application, the network device may send the reference signal configuration information and the BWP configuration information to the terminal device, so that the terminal device may parse the reference signal configuration information and the BWP configuration information, and obtain quality of a cell based on the reference signal. Therefore, in this embodiment of this application, the reference signal can be measured without starting a measurement gap, thereby reducing activation of the measurement gap and reducing data receiving and sending of the terminal device.

The foregoing embodiment describes the reference signal processing method provided in the embodiments of this application from a network device side, and the following describes the reference signal processing method provided in the embodiments of this application from a terminal device side. As shown in FIG. 3, an embodiment of this application provides a reference signal processing method, mainly including the following steps.

301. A terminal device obtains reference signal configuration information and bandwidth part BWP configuration information that are sent by a network device.

In this embodiment of this application, the network device may send the reference signal configuration information and the BWP configuration information to the terminal device, and the terminal device may receive the reference signal configuration information and the BWP configuration information from the network device. For example, the terminal device may receive the reference signal configuration information and the BWP configuration information by using a wireless network. The network device may add the reference signal configuration information and the BWP configuration information to same control signaling, and send the control signaling to the terminal device. Alternatively, the network device may add the reference signal configuration information and the BWP configuration information to two different pieces of control signaling respectively, and send the control signaling to the terminal device. No limitation is imposed herein. The control signaling used by the network device may be higher layer signaling.

302. The terminal device determines a to-be-measured reference signal based on the reference signal configuration information, and determines, based on the BWP configuration information, a BWP configured for the terminal device.

In this embodiment of this application, after the terminal device receives the reference signal configuration information and the BWP configuration information from the network device, the terminal device may parse the reference signal configuration information and the BWP configuration information, and the terminal device may determine content of the reference signal and content of the BWP that are configured by the network device. For example, the terminal device determines, by parsing the reference signal configuration information, the to-be-measured reference signal configured by the network device for the terminal device, and the terminal device determines, by parsing the BWP configuration information, the BWP configured by the network device for the terminal device.

303. The terminal device obtains quality of a cell based on the reference signal, where the BWP configured for the terminal device belongs to the cell.

In this embodiment of this application, the terminal device may determine, by performing the foregoing step 302, the BWP configured by the network device for the terminal device, and the terminal device may further determine the configuration of the reference signal by the network device. Therefore, the terminal device may obtain the quality of the cell based on the reference signal. The cell may include the BWP configured for the terminal device. Measurement of the quality of the cell may be performed by receiving the reference signal through an antenna of the terminal device and then calculating by using a processor of the terminal device.

In some embodiments of this application, in addition to performing the foregoing steps, the reference signal processing method provided in this embodiment of this application may include the following steps: obtaining, by the terminal device, gap configuration information sent by the network device, where the gap configuration information includes period information of a first gap and offset information of the first gap; and determining, by the terminal device, duration of the first gap based on the period information of the first gap and the offset information of the first gap.

The network device may further configure the first gap used by the network device to send the reference signal, where the first gap may be a gap that occurs periodically. The network device may configure the period of the first gap and the offset of the first gap. The first gap may occur based on a time period, and the offset of the first gap is an offset of an occurrence time of the first gap. The period of the first gap and the offset of the first gap may be used to calculate duration of the first gap each time. The terminal device may receive the gap configuration information from the network device. After parsing the gap configuration information, the terminal device can determine the period and the offset that are configured by the network device for the first gap.

For example, the first gap occurs periodically, and the period and the offset of the first gap can be used together to calculate time information of the first gap. Specifically, the time information of the first gap may be directly calculated according to the following formula:

$$SFN1 \bmod T1 = FLOOR(gapOffset/10) \qquad \text{(Formula 1)}$$

A frame that satisfies the system frame number (SFN) 1 in formula 1 may be determined as a frame of the first gap. In formula 1, SFN represents a frame number at which a measurement gap starts. Because the time information of the first gap is calculated, SFN 1 represents a start frame number of the first gap. T1 represents a period of the first gap, gapOffset represents an offset of the first gap, FLOOR( )

represents a round-down operation, and mod represents a modulo operation, that is, a remainder operation. Formula 1 is used to calculate the start frame number of the first gap. To make a calculation result more accurate to obtain a location of a start subframe, the following formula may also be used in this embodiment of this application:

$$\text{Subframe1=gapOffset mod 10} \qquad \text{(Formula 2)}$$

In formula 2, subframe 1 represents a start subframe number of the first gap. Therefore, by using formula 1 and formula 2, the terminal device may calculate the start frame number and subframe numbers of the first gap, thereby determining the start time of the first gap more accurately.

After the start time of the first gap is obtained, the terminal device may further calculate the duration of the first gap based on the start time of the first gap and the length of the first gap. For example, the terminal device determines the duration of the first gap based on the start time of the first gap and the time length of the first gap, where the length of the first gap may be a fixed length, for example, 6 milliseconds (ms), or a length configured by the network device for the terminal device, for example, 3 ms.

Further, in some embodiments of this application, the obtaining, by the terminal device, quality of a cell based on the reference signal in step 303 includes: determining, by the terminal device, an active BWP, where the active BWP is one or more BWPs in BWPs configured for the terminal device; after the terminal device determines the duration of the first gap, determining, by the terminal device, whether a frequency domain location of the reference signal is within a bandwidth range of the active BWP; and if the frequency domain location of the reference signal is within the bandwidth range of the active BWP, deactivating, by the terminal device, the first gap, and obtaining the quality of the cell based on the reference signal corresponding to the active BWP.

The terminal device may first determine the BWP activated by the network device, and then after the terminal device calculates the duration of the first gap by performing the foregoing steps, the terminal device determines whether the frequency domain location of the reference signal is within the bandwidth range of the active BWP. If the frequency domain location of the reference signal is within the bandwidth range of the active BWP, it indicates that the terminal device can obtain, without using the first gap, the quality of the cell corresponding to the reference signal. In this case, the terminal device may deactivate the first gap. In this embodiment of this application, the terminal device may determine the active BWP, thereby reducing a gap start time. Therefore, a data transmission interruption between the network device and the terminal device is reduced.

In some embodiments of this application, after the determining, by the terminal device, whether a frequency domain location of the reference signal is within a bandwidth range of the active BWP in the foregoing embodiment, the method provided in this embodiment of this application further includes the following step: if the frequency domain location of the reference signal is not within the bandwidth range of the active BWP, activating, by the terminal device, the first gap, and obtaining the quality of the cell that is in the activated first gap and that corresponds to the reference signal.

If the frequency domain location of the reference signal is not within the bandwidth range of the active BWP, it indicates that the reference signal is not within the bandwidth range of the active BWP. In this case, the foregoing first gap is required. After the first gap is activated, the terminal device may obtain the quality of the cell that is in the activated first gap and that corresponds to the reference signal. In this embodiment of this application, the terminal device may activate the first gap, thereby obtaining the quality of the cell in the first gap.

In some embodiments of this application, the BWP configuration information further includes activation time information of the BWP, and the activation time information of the BWP includes an activation time period of the BWP configured for the terminal device and an activation time offset of the BWP configured for the terminal device. The obtaining, by the terminal device, quality of a cell based on the reference signal, in step 303 may specifically include the following steps: determining, by the terminal device based on the activation time period of the BWP configured for the terminal device and the activation time offset of the BWP configured for the terminal device, a start time of the BWP configured for the terminal device; and obtaining, by the terminal device from the start time of the BWP configured for the terminal device, the quality of the cell that is in an activation time length configured for the terminal device and that corresponds to the reference signal.

The network device may also activate the BWP for the terminal device, and the terminal device receives the activation time information of the BWP from the network device. The activation time information of the BWP may include at least one of the following parameters: an activation time period of the at least one BWP and an activation time offset of the at least one BWP. An activation time of the at least one BWP occurs periodically, and the activation time period and the activation time offset can be used together to calculate the activation time of the at least one BWP. Specifically, a start time of the activation time may be calculated according to the following formula 3:

$$\text{SFN2 mod } T2\text{=FLOOR(timeoffset/10)} \qquad \text{(Formula 3)}$$

In formula 3, a frame in which the activation time of the BWP occurs can be determined by using SFN 2. In formula 3, SFN 2 represents the start frame number of the activation time, T2 represents the activation time period, the activation time offset is represented by timeoffset, FLOOR( ) represents a round-down operation, and mod represents a modulo operation, that is, a remainder operation. Formula 3 is used to calculate the start frame number of the activation time. To make a calculation result more accurate to obtain a location of a start subframe, the following formula 4 may also be used in this embodiment of this application:

$$\text{Subframe2=timeoffset mod 10} \qquad \text{(Formula 4)}$$

In formula 4, subframe 2 represents a start subframe number of the activation time of the BWP. Therefore, by using formula 3 and formula 4, the start frame number and the start subframe number that are of the activation time of the BWP can be calculated, thereby determining activation time information of the BWP more accurately.

In some embodiments of this application, the activation time length is included in the activation time information of the BWP, or the activation time length is locally configured by the terminal device. The BWP configuration information may further include information about the activation time length of the at least one BWP. The terminal device may determine the activation duration of the at least one BWP based on the start time of the at least one BWP and the activation time length of the at least one BWP, where the activation duration of the at least one BWP is used for data transmission between the terminal device and the network device.

In some embodiments of the present application, the BWP configuration information further includes: a quantity of BWPs is N, N is greater than or equal to 2, and bandwidth of each of the N BWPs includes a configured to-be-measured reference signal; and the obtaining, by the terminal device, quality of a cell based on the reference signal, in step 303 includes: obtaining, by the terminal device in a measurement period, M sampling results corresponding to a reference signal within a bandwidth range of a BWP activated at a sampling moment, where M is a positive integer; and calculating, by the terminal device, the quality of the cell based on the M sampling results.

If the active BWP of the terminal device is changed in an activation period, the terminal device may obtain measurement sampling values of different reference signals. The terminal device may obtain, in the measurement period, a plurality of sampling results of reference signals corresponding to a plurality of BWPs, and the terminal device may use the sampling results of the plurality of BWPs as the quality of the cell. Therefore, the terminal device can implement measurement of the quality of the cell without starting the gap.

Further, in some embodiments of the present application, the calculating, by the terminal device, the quality of the cell based on the M sampling results in step 303 includes: extracting, by the terminal device, H sampling results from the M sampling results, where H is less than M, the H sampling results are sampling results obtained by sampling a reference signal corresponding to a first BWP, and the first BWP is a default BWP or an initial BWP; and calculating, by the terminal device, the quality of the cell based on the H sampling results.

The terminal device obtains a plurality of sampling results, for example, obtains M sampling results. The terminal device may further select H sampling results from the M sampling results, and the selected sampling results may be sampling results corresponding to the default BWP or the initial BWP. The default BWP is a BWP returned by the terminal device within a particular period of time after the data transmission ends, and the initial BWP is a BWP used when the terminal device is in initial access. The quality of the cell, calculated based on the H sampling results corresponding to the default BWP or the initial BWP, can better indicate real signal quality of a serving cell, thereby improving calculation accuracy of the quality of the cell.

It can be learned from description of examples in this application in the foregoing embodiments that the terminal device obtains the reference signal configuration information and the BWP configuration information that are sent by the network device; the terminal device determines the to-be-measured reference signal based on the reference signal configuration information, and determines, based on the BWP configuration information, the BWP configured for the terminal device; and the terminal device obtains the quality of the cell based on the reference signal, where the BWP configured for the terminal device belongs to the cell. Because the terminal device can parse the reference signal configuration information and the BWP configuration information, the terminal device can obtain the quality of the cell based on the reference signal. Therefore, in this embodiment of this application, the reference signal can be measured without starting a measurement gap, thereby reducing activation of the measurement gap and reducing data receiving and sending of the terminal device.

To better understand and implement the foregoing solutions in the embodiments of this application, a corresponding application scenario is used as an example below for specific description.

Figure 4:
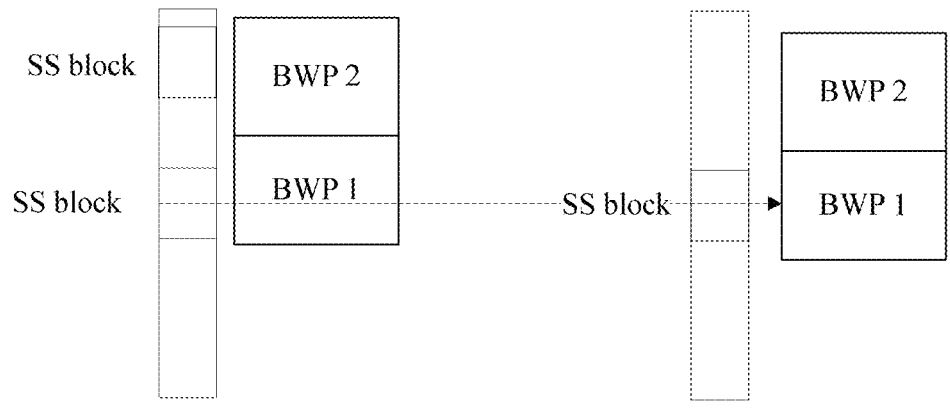
FIG. 4 is a schematic diagram of a BWP implementation according to an embodiment of this application.

FIG. 4 is a schematic diagram of a BWP implementation according to an embodiment of this application. A reference signal sent by a network device may be specifically an SS. There is a synchronization signal set periodicity for SS sending. One SS set periodicity includes a plurality of synchronization signal bursts (SS burst), and each synchronization signal burst includes a plurality of synchronization signal blocks (SS block). In this embodiment of this application, one cell may include a plurality of BWPs, for example, a BWP 1 and a BWP 2. It is possible that each BWP is configured with an SS, or it is possible that only some of the BWPs are configured with SSs.

The reference signal processing method provided in this embodiment of this application may avoid or reduce a measurement gap (which may also be referred to as a GAP in subsequent embodiments). In this embodiment of this application, there may be various methods for reducing the gap: 1. A terminal device determines, based on an active BWP, whether a gap needs to be started. For specific content, refer to an embodiment shown in FIG. 5. 2. The network device configures a periodic activation time period of the BWP, and the terminal device performs measurement in this time period to avoid starting of the gap. For specific content, refer to an embodiment shown in FIG. 6. 3. The terminal device performs measurement by using reference signals of a plurality of active BWPs to avoid starting of the gap. For specific content, refer to an embodiment shown in FIG. 7.

Figure 5:
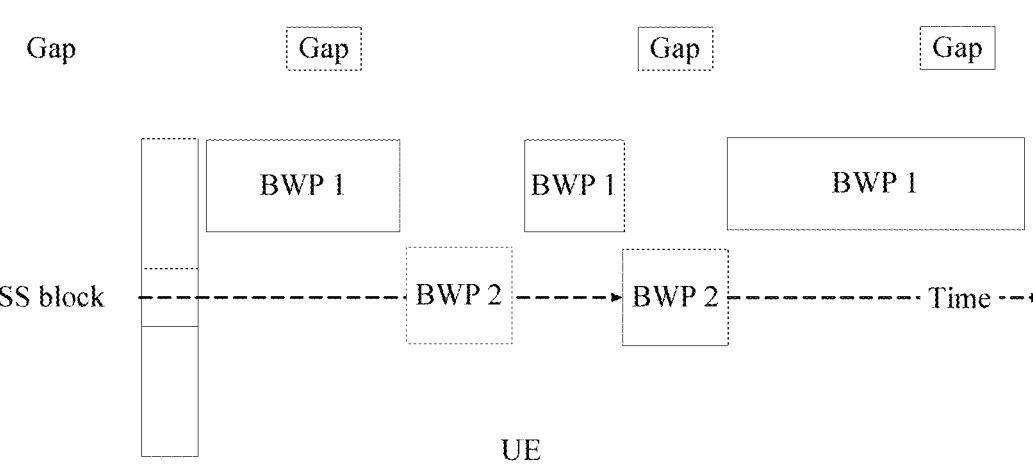
FIG. 5 is a schematic diagram of a reference signal configuration manner according to an embodiment of the present application.

FIG. 5 is a schematic diagram of a reference signal configuration manner according to an embodiment of the present application. The configuration manner may mainly include the following process.

Step 10: A network device sends BWP configuration information and to-be-measured reference signal configuration information to a terminal device. The terminal device receives a BWP set configured by the network device, and the BWP set includes one or more pieces of BWP configuration information. At least one BWP includes a corresponding reference signal. The reference signal is an SS or a CSI-RS. The to-be-measured reference signal information may be an SS or CSI-RS information. The reference signal configuration information may be a reference information type, such as an SS or a CSI-RS type. The reference signal configuration information may further include a period and/or a frequency domain location of the reference signal.

Step 20: The network device configures a gap parameter for the terminal device, where the gap parameter is used to assist the terminal device in measurement of the reference signal.

In this case, the gap parameter may include period information of a gap, and an offset of the gap. The gap occurs periodically, and a location of the gap can be calculated based on the offset and the period of the gap together. For example, it is shown in formula 1 and formula 2 in the foregoing embodiment. Details are not described herein again.

The terminal device determines the time location of the gap based on a calculated gap start time and gap length information. The gap length information may be a fixed length, for example, 6 ms, or a length configured by the network device for the terminal device, for example, 3 ms.

The terminal device determines, based on the time location of the gap, that at the time location, the terminal stops data receiving and sending for a serving cell or an active BWP, and measures a target reference signal in this period of time.

The gap parameter further includes reference signal association information corresponding to the gap, to instruct the terminal device to measure, in the gap, a reference signal associated with the reference signal association information. The reference signal association information may be specifically frequency information. The reference information associated with the reference signal association information may be a reference signal included in a frequency.

Step 30: The terminal device receives the gap parameter, and obtains quality of a cell based on the gap parameter and the active BWP.

The terminal device needs to determine whether it is necessary to interrupt receiving and sending for the serving cell or the active BWP at the time location of the gap. If at the time location of the gap, the active BWP of the terminal device and a to-be-measured reference signal meet a first predetermined condition, the terminal device determines to deactivate the gap, that is, the data receiving and sending for the serving cell or the active BWP does not need to be interrupted. Otherwise, the terminal device determines that the gap needs to be activated, that is, the data receiving and sending for the serving cell or the active BWP needs to be interrupted.

The first predetermined condition includes: a frequency domain location of the to-be-measured reference signal is within a bandwidth range of the active BWP; center frequencies of the active BWP and the to-be-measured reference signal are the same; and subcarrier spacings of the active BWP and the to-be-measured reference signal are the same.

Optionally, the foregoing determining is performed only when the to-be-measured reference signal belongs to reference signals associated with the gap.

It should be noted that, in some embodiments of this application, the gap may be configured to measure only some measurement objects, and reference signals included in these measurement objects may be considered as reference signals associated with the gap. If the gap needs to be activated, the terminal device activates the gap, and measurement of a measurement signal that belongs to the gap is performed in the gap to obtain the quality of the cell. If the gap does not need to be activated, the terminal device directly obtains the quality of the cell.

It can be learned from the foregoing example description that the terminal device further determines the active BWP, thereby reducing a GAP start time.

Figure 6:
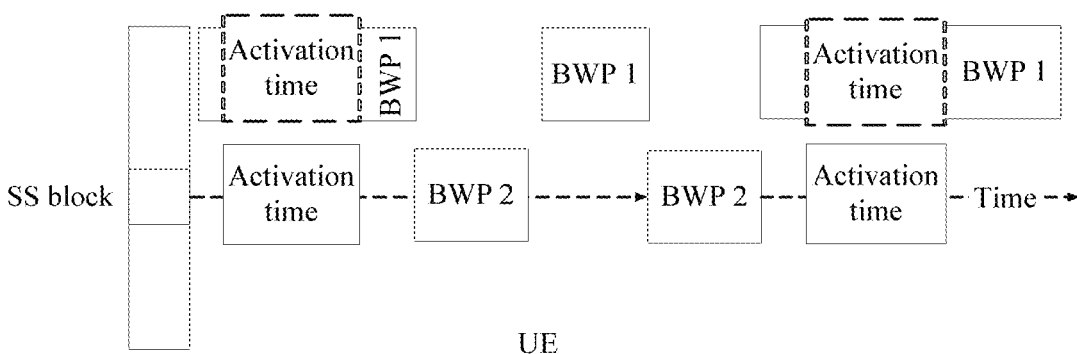
FIG. 6 is a schematic diagram of another reference signal configuration manner according to an embodiment of the present application.

FIG. 6 is a schematic diagram of another reference signal configuration manner according to an embodiment of the present application. The configuration manner mainly includes the following steps.

Step 20: A network device configures BWP configuration information and periodic activation time information for a terminal device. The terminal device receives a BWP set configured by the network device, and the BWP set includes one or more pieces of BWP configuration information.

A frequency band of at least one BWP includes a to-be-measured reference signal. The reference signal is an SS or a CSI-RS.

The network device further configures the periodic activation time information for the at least one BWP. The periodic activation time information may include: period information of an activation time and an offset of the activation time. The activation time occurs periodically, and a location of the activation time can be calculated based on the period and the offset of the activation time together. A specific calculation process is shown in formula 3 and formula 4 in the foregoing embodiments.

Optionally, the BWP configuration information further includes information about the activation time length of the at least one BWP.

Step 21: The terminal device needs to activate the BWP at the activation time of the at least one BWP, and obtain quality of a cell of a reference signal included in the BWP.

The terminal device calculates a start time point of the BWP based on the configuration information, and determines the activation time length of the BWP. The activation time length may be a predefined time length, or may be an activation time length carried in the configuration information. The terminal device obtains, within the activation time length, the quality of the cell corresponding to the reference information.

It can be learned from the foregoing example description that a periodic activation time of the BWP is configured, thereby ensuring a measurement time of the terminal device in the BWP.

Figure 7:
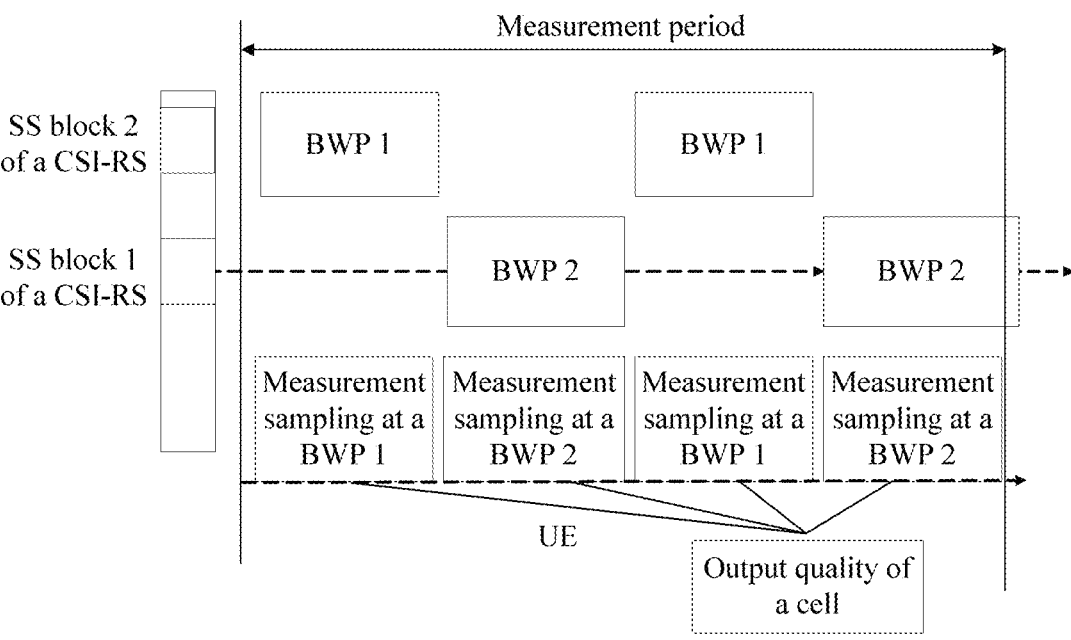
FIG. 7 is a schematic diagram of still another reference signal configuration manner according to an embodiment of the present application.

FIG. 7 is a schematic diagram of still another reference signal configuration manner according to an embodiment of the present application. The configuration manner mainly includes the following process.

Step 30: A network device sends BWP configuration information and to-be-measured reference signal configuration information to a terminal device.

Step 31: The terminal device receives a BWP set configured by the network device, and the BWP set includes one or more pieces of BWP configuration information.

At least one BWP includes a corresponding reference signal. The reference signal is an SS or a CSI-RS.

The to-be-measured reference signal information may be an SS or a CSI-RS.

The reference information configuration information may be a reference information type, such as an SS or a CSI-RS.

The reference signal configuration information may further include a period and/or a frequency domain location of the reference signal.

Step 32: The terminal device obtains quality of a cell based on the reference signal configuration information.

The terminal device receives a BWP set configured by the network device, and the BWP set includes one or more pieces of BWP configuration information.

When each BWP includes a corresponding reference signal, the terminal device obtains the quality of the cell based on reference signals of a plurality of BWPs. The reference signal is an SS or a CSI-RS.

In a measurement period, the terminal device obtains a sampling result based on a reference signal included in an active BWP. If the terminal device has a plurality of active BWPs in a measurement period, there may be measurement samples of a plurality of BWPs. The terminal device obtains the quality of the cell based on these samples. The terminal device may have N sampling values in this period. If M sampling values are needed to calculate the quality of the cell, and M is less than or equal to N, M may be selected from N according to the following rules: default BWP and initial BWP sampling preference. A default BWP is configured by the network device for the terminal device, and an initial BWP is a BWP used when the terminal device is in initial access.

The terminal device performs average calculation on selected sampling results to obtain the quality of the cell.

For example, if four times of measurement samplings are performed in the measurement period to obtain four sampling results, the terminal device performs average calculation on these measurement results and uses the average result as the quality of the cell in this period.

It can be learned from the foregoing example description that measurement results of a plurality of BWPs are used as the quality of the cell, thereby reducing use of a gap.

This embodiment of this application may further resolve the following problem: In combination with a blacklist and a whitelist that correspond to a measurement event and a blacklist and a whitelist that are of a measurement object level, a BWP or a neighboring cell reference signal that needs to be measured by the terminal device and that is included in a serving cell is determined. A measurement event configuration BWP indication is used to determine that the measurement event is for the BWP in the serving cell. The network device may specify a measurement quantity for beam selection when cell measurement result calculation and beam reporting are performed.

Figure 8:
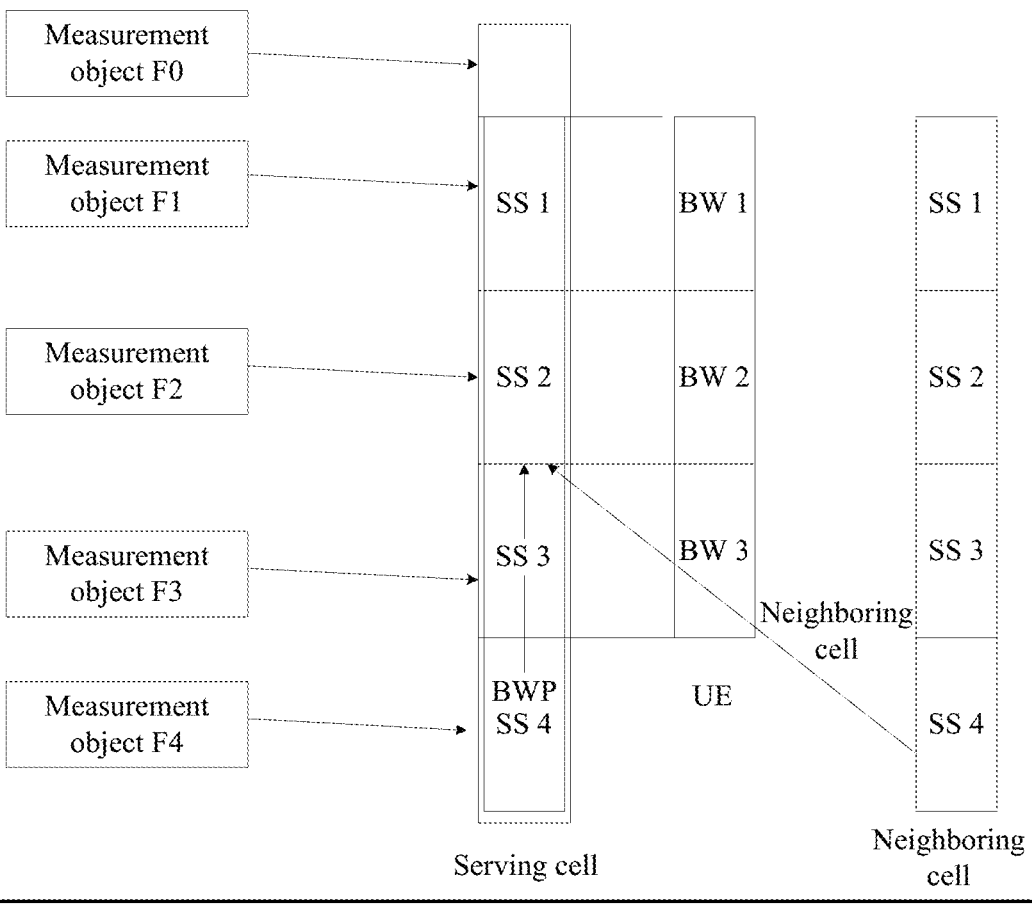
FIG. 8 is a schematic diagram of yet another reference signal configuration manner according to an embodiment of the present application.

FIG. 8 is a schematic diagram of yet another reference signal configuration manner according to an embodiment of the present application. The configuration manner mainly includes the following process.

Step 40: A network device configures to-be-measured reference signal configuration information for a terminal device. The to-be-measured reference signal information may be an SS or a CSI-RS.

The to-be-measured reference information configuration information is included in a measurement object, and a measurement object configuration may include at least one or a combination of the following configurations, for example: a type of a to-be-measured reference signal, for example an SS or a CSI-RS; and blacklist or whitelist information, where if the network device configures a blacklist for the terminal device, when the measurement object is measured, the terminal device ignores a cell in the blacklist; or if the network device configures a whitelist for the terminal device, when the measurement object is measured, the terminal device considers only a cell in the whitelist, and does not consider other cells.

The network device further configures a measurement evaluation parameter for the terminal device, where the measurement evaluation parameter includes at least one or a combination of the following configuration information: a maximum beam quantity N used for cell measurement result calculation (a cell measurement result is obtained by combining beam measurement results), where optionally, if the maximum beam quantity is not configured, the terminal device may use N=1 by default; a measurement threshold (H) used for cell measurement result calculation; a measurement quantity (Q) for beam sequencing, where, for example, the measurement quantity for beam sequencing may be a reference signal received power (RSRP), reference signal received quality (RSRQ), or a signal to interference plus noise ratio (SINR) of a beam; currently, both calculating the cell measurement result based on the beam measurement results or reporting the beam measurement results need to perform beam sequencing, to select a best beam set; however, when sequencing is performed based on the RSRP, the RSRQ, or the SINR, beams included in the best beam set may be changed; and in this case, if the measurement quantity used for the sequencing is specified, a beam set used for calculating the cell measurement result or a beam set corresponding to beam reporting is uniquely determined; a measurement quantity (M) that needs to be reported: one or any combination of the RSRQ, the RSRP, or the SINR; and a measurement quantity (T) for triggering a measurement event that is used by the terminal device to determine a measurement quantity on which measurement event triggering is based.

The measurement quantity (Q) for beam sequencing, the measurement quantity (T) for triggering a measurement event, and the measurement quantity (M) that needs to be reported are not limited to being configured in the measurement object, and may alternatively be sent, by the network device through measurement configuration, to the terminal device to which Q, T, and M belong. For example, Q, T, and M are carried in a measurement and reporting configuration, a measurement quantity configuration, or a measurement trigger configuration. No limitation is imposed in this disclosure.

Step 41: The network device configures measurement trigger information for the terminal device, where the measurement trigger information includes event trigger information or periodic measurement configuration information, the event trigger information is used to instruct the terminal device to trigger measurement and reporting based on a to-be-measured reference signal, and the periodic measurement configuration information is used to instruct the terminal device to perform measurement and reporting based on a period.

The measurement event is used for comparing a measurement target and a measurement reference. When a comparison result satisfies a predetermined condition, it is determined that the measurement result needs to be reported. The measurement target may be a serving cell or a neighboring cell. The measurement reference may be a measurement signal threshold or a measurement result on a serving cell side. The terminal device needs to first determine the measurement result of the cell corresponding to the measurement target and then determine whether the measurement event is triggered. For example, if the measurement target is a cell included in a measurement object 1, the terminal device searches for the cell on a frequency corresponding to the measurement object 1, and compares the cell measurement result with the measurement reference. If the cell measurement result is greater than or less than the measurement reference, the measurement event is triggered.

Optionally, the event trigger information further includes a blacklist or a whitelist for the measurement event.

Step 42: The terminal device receives the measurement configuration information, where the measurement configuration information includes the reference signal configuration, the measurement evaluation parameter, and the measurement trigger information, and the terminal device performs measurement and reporting based on the reference signal configuration, the measurement evaluation parameter, and the measurement trigger information.

The terminal device determines one or a combination of the following parameters based on the measurement configuration information: a type of a to-be-measured reference signal, for example, an SS or a CSI-RS; a maximum beam quantity N used for cell measurement result calculation (a cell measurement result is obtained by combining beam measurement results): Optionally, if the maximum beam quantity is not configured, the terminal device may use N=1 by default; a measurement threshold (H) used for cell measurement result calculation; a measurement quantity (Q) for beam sequencing; a measurement quantity (M) that needs to be reported; and a measurement quantity (T) for triggering a measurement event.

The terminal device performs measurement and reporting based on the measurement configuration parameter.

Optionally, when the cell of the measurement target is measured, to-be-measured cells need to be determined based on the blacklist or whitelist included in the measurement object. If a configuration of the measurement event includes configuration of the blacklist or the whitelist, the terminal device needs to finally determine, based on the blacklist or whitelist in the measurement object and the blacklist or whitelist in the measurement event, a blacklist or whitelist cell to be used.

Specifically, when the measurement event includes a whitelist, a whitelist in the measurement object is ignored, and only a whitelist specified by the measurement event is used.

When the measurement event includes a blacklist, a blacklist in the measurement object and a blacklist in the measurement event are combined for use.

The terminal device performs measurement based on the finally determined blacklist or whitelist, obtains quality of a cell corresponding to the measurement target, and determines whether to trigger the measurement event based on a comparison between the quality of the cell and a measurement source. For different measurement events, there may be different blacklists and whitelists. For a same measurement object, for example, an event 1 may be only for a reference signal that is not of a local cell, and an event 2 may be only for a reference signal of the local cell.

Optionally, when the terminal device performs measurement of the cell of the measurement target, the cell measurement result needs to be calculated based on beams of the cell. The terminal device first performs cell measurement result calculation based on the parameters configured by the network device, including: determining, by the terminal device based on N, H, and Q, beams used to calculate the cell measurement result.

The terminal device sequences the beams in the cell based on a measurement quantity (for example, the RSRQ, the RSRP, or the SINR) specified by Q.

The beam ranked first is used as a first beam, and beams whose measurement results are greater than the threshold H and whose total quantity is less than or equal to (N−1) are selected from the other beams as a second beam set.

The cell measurement result is calculated by using the second beam set based on a quantity (for example, one or any combination of the RSRQ, the RSRP, or the SINR) specified in a report quantity.

If N=1, the measurement result of the first beam is used as the quality of the cell. If N>1, the first beam and the second beam set are averaged as the quality of the cell.

Optionally, when reporting a measurement result, the terminal device needs to determine a set of to-be-reported beams. The terminal device sequences the beams in the cell based on a measurement quantity (for example, the RSRQ, the RSRP, or the SINR) specified by Q or T, and reports the beam set based on a sequencing result.

Specifically, the terminal device determines to report, based on the threshold H and a maximum quantity X of reported beams, beams whose measurement quantity is greater than the threshold H and whose quantity is less than or equal to X. X is a reporting quantity specified by the network device for the terminal device. The terminal device reports, to a network device side, a measurement result corresponding to each beam.

For example, the measurement quantity specified by Q or T is RSRQ, H=−98 dbm, and X=3. If there are five beams measured by the terminal device, the terminal device sequences the five beams based on an RSRQ measurement result, where there are two beams whose measurement results are greater than −98, and the best two beams are used as beams reported to a set. If there are four beams whose measurement results are greater than −98, the best three beams are selected and reported. If measurement results of all beams are below the threshold −98, the terminal device reports only the best beam.

Optionally, the terminal device first adds, based on a measurement quantity specified by the reported measurement quantity (M), a best beam corresponding to each measurement quantity to the set of the reported beams, and then sequences the remaining beams based on the measurement quantity specified by Q or T, and determines, based on a sequencing result, beams that are in the remaining beams and that are to be placed in the set of the reported beams.

Optionally, that the terminal device sequences the beams in the cell based on the measurement quantity (for example, the RSRQ, the RSRP, or the SINR) specified by Q or T may further include: selecting, by the terminal device, T and Q based on a measurement trigger type. For example, for an event measurement result, the terminal device sequences to-be-reported beams based on T, and for periodic measurement, the terminal device sequences to-be-reported beams based on Q.

Optionally, the terminal device sequences the beams in the cell based on a configuration of the reported measurement quantity (M). If the terminal device determines that the measurement quantity (M) includes only one measurement quantity, the terminal device performs beam sequencing based on the measurement quantity, and based on a beam sequencing result, calculates the quality of the cell or determines a to-be-reported beam set.

In this embodiment, a measurement quantity used for beam sequencing is specified, thereby ensuring that the terminal device has a consistent sequencing criterion during beam sequencing. In addition, a blacklist and a whitelist are configured for a measurement event, so that different measurement events may be configured with different blacklists and whitelists.

It should be noted that, for brief description, the foregoing method embodiments are represented as a series of actions. However, a person skilled in the art should know that this application is not limited to the described order of the actions because according to this application, some steps may be performed in other orders or simultaneously. The person skilled in the art should also know that the related actions and modules described in this disclosure are not necessarily required by this application.

To better implement the foregoing solutions in this embodiment of this application, a related apparatus configured to implement the foregoing solutions is further provided below.

Figure 9:
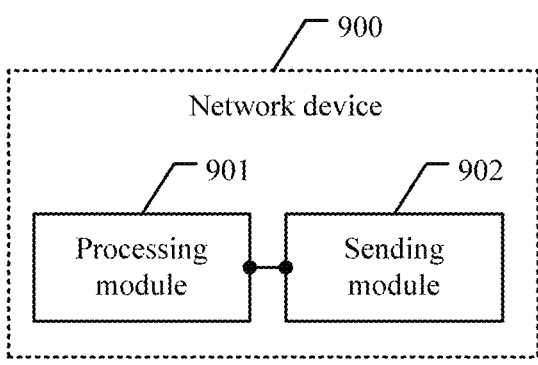
FIG. 9 is a schematic structural diagram of a network device according to an embodiment of this application.

FIG. 9 shows a network device 900 according to an embodiment of this application. The network device 900 may include a processing module 901 and a sending module 902.

The processing module 901 is configured to determine a to-be-measured reference signal configured for a terminal device and at least one bandwidth part BWP configured for the terminal device, where a frequency domain location of the reference signal is within a bandwidth range of the at least one BWP.

The processing module 901 is further configured to generate reference signal configuration information based on the to-be-measured reference signal, and generate BWP configuration information based on the at least one BWP.

The sending module 902 is configured to send the reference signal configuration information and the BWP configuration information to the terminal device.

In some embodiments of the present application, the processing module 901 is further configured to determine a period of a first gap and an offset of the first gap that are configured for the terminal device, where the first gap is used by the network device to send the reference signal.

The sending module 902 is further configured to send gap configuration information to the terminal device, where the gap configuration information includes the period of the first gap and the offset of the first gap.

In some embodiments of the present application, the processing module 901 is configured to: calculate a start time of the first gap based on the period of the first gap and the offset of the first gap; calculate duration of the first gap based on the start time of the first gap and a length of the first gap; determine whether the frequency domain location of the reference signal is within a bandwidth range of an active BWP in the duration of the first gap; and if the frequency domain location of the reference signal is within the bandwidth range of the active BWP in the duration of the first gap, determine to deactivate the first gap.

In some embodiments of the present application, the reference signal configuration information includes at least one of the following parameters: a type parameter of the reference signal, a period parameter of the reference signal, and a frequency domain location parameter of the reference signal.

In some embodiments of the present application, the BWP configuration information includes: frequency information of the at least one BWP and bandwidth information of the at least one BWP.

In some embodiments of the present application, the BWP configuration information includes a correspondence between the reference signal and the at least one BWP.

In some embodiments of the present application, the BWP configuration information includes activation time information of the BWP; and the activation time information of the BWP includes at least one of the following parameters: an activation time period of the at least one BWP and an activation time offset of the at least one BWP.

In some embodiments of the present application, the processing module 901 is configured to calculate a start time of the at least one BWP based on the activation time period of the at least one BWP and the activation time offset of the at least one BWP.

The processing module 901 is further configured to determine activation duration of the at least one BWP based on the start time of the at least one BWP and an activation time length of the at least one BWP, where the activation duration of the at least one BWP is used for data transmission between the network device and the terminal device.

Figure 10:
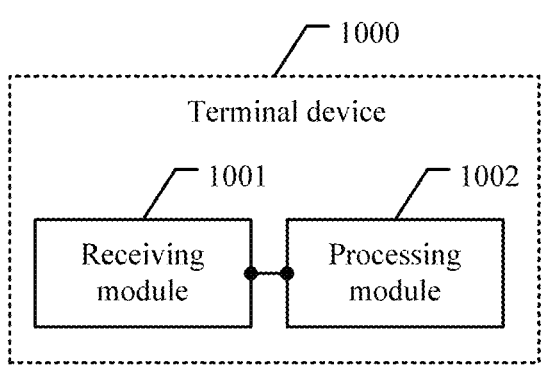
FIG. 10 is a schematic structural diagram of a terminal device according to an embodiment of this application.

FIG. 10 shows a terminal device 1000 according to an embodiment of this application. The terminal device 1000 may include a receiving module 1001 and a processing module 1002.

The receiving module 1001 is configured to obtain reference signal configuration information and bandwidth part BWP configuration information that are sent by a network device.

The processing module 1002 is configured to determine a to-be-measured reference signal based on the reference signal configuration information, and determine, based on the BWP configuration information, a BWP configured for the terminal device.

The processing module 1002 is configured to obtain quality of a cell based on the reference signal, where the BWP configured for the terminal device belongs to the cell.

In some embodiments of the present application, the receiving module 1001 is further configured to obtain gap configuration information sent by the network device, where the gap configuration information includes period information of a first gap and offset information of the first gap.

The processing module 1002 is further configured to determine duration of the first gap based on the period information of the first gap and the offset information of the first gap.

In some embodiments of the present application, the processing module 1002 is configured to: determine an active BWP, where the active BWP is one or more BWPs in BWPs configured for the terminal device; after the terminal device determines the duration of the first gap, determine whether a frequency domain location of the reference signal is within a bandwidth range of the active BWP; and if the frequency domain location of the reference signal is within the bandwidth range of the active BWP, deactivate the first gap, and obtain the quality of the cell based on the reference signal corresponding to the active BWP.

In some embodiments of the present application, after determining whether the frequency domain location of the reference signal is within the bandwidth range of the active BWP, the processing module 1002 is configured to: if the frequency domain location of the reference signal is not within the bandwidth range of the active BWP, activate the first gap; and obtain the quality of the cell that is in the activated first gap and that corresponds to the reference signal.

In some embodiments of the present application, the BWP configuration information further includes activation time information of the BWP, and the activation time information of the BWP includes an activation time period of the BWP configured for the terminal device and an activation time offset of the BWP configured for the terminal device. The processing module 1002 is configured to: determine, based on the activation time period of the BWP configured for the terminal device and the activation time offset of the BWP configured for the terminal device, a start time of the BWP configured for the terminal device; and obtain, from the start time of the BWP configured for the terminal device, the quality of the cell that is in an activation time length configured for the terminal device and that corresponds to the reference signal.

In some embodiments of the present application, the activation time length is included in the activation time information of the BWP, or the activation time length is locally configured by the terminal device.

In some embodiments of the present application, the BWP configuration information further includes: when a quantity of BWPs is N and N is greater than or equal to 2, bandwidth of each of the N BWPs includes a configured to-be-measured reference signal. The processing module 1002 is specifically configured to: obtain, in a measurement period, M sampling results corresponding to a reference signal within a bandwidth range of a BWP activated at a sampling moment, where M is a positive integer; and calculate the quality of the cell based on the M sampling results.

In some embodiments of the present application, the processing module 1002 is specifically configured to: extract H sampling results from the M sampling results, where H is less than M, the H sampling results are sampling results obtained by sampling a reference signal corresponding to a first BWP, and the first BWP is a default BWP or an initial BWP; and calculate the quality of the cell based on the H sampling results.

It can be learned from description of examples in this application in the foregoing embodiments that the terminal device obtains the reference signal configuration information and the BWP configuration information that are sent by the network device; the terminal device determines the to-be-measured reference signal based on the reference signal configuration information, and determines, based on the BWP configuration information, the BWP configured for the terminal device; and the terminal device obtains the quality of the cell based on the reference signal, where the BWP configured for the terminal device belongs to the cell. Because the terminal device can parse the reference signal configuration information and the BWP configuration information, the terminal device can obtain, based on the BWP configured for the terminal device, the quality of the cell corresponding to the reference signal. Therefore, in this embodiment of this application, the reference signal can be measured without starting a measurement gap, thereby reducing activation of the measurement gap and reducing data receiving and sending of the terminal device.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application, and the details are not described herein again.

An embodiment of this application further provides a computer storage medium, where the computer storage medium stores a program and the program performs some or all of steps recorded in the foregoing method embodiments.

Figure 11:
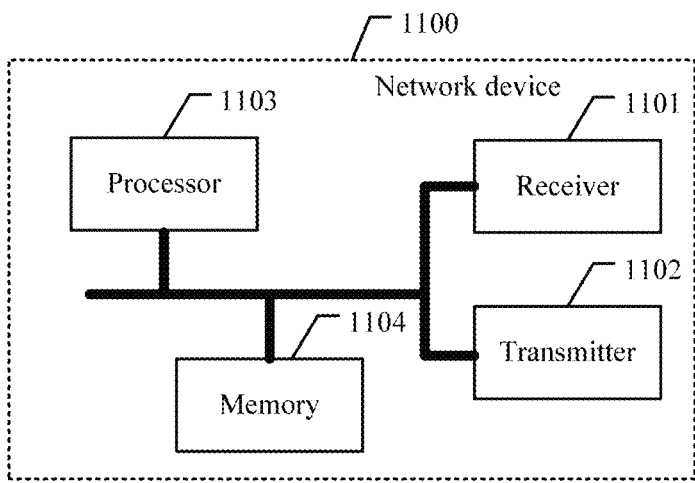
FIG. 11 is a schematic structural diagram of another network device according to an embodiment of this application.

Another network device provided in the embodiments of this application is described below. As shown in FIG. 11, the network device 1100 includes: a receiver 1101, a transmitter 1102, a processor 1103, and a memory 1104 (where there may be one or more processors 1103 in the network device 1100, and one processor is used as an example in FIG. 11). In some embodiments of this application, the receiver 1101, the transmitter 1102, the processor 1103, and the memory 1104 may be connected with each other.

The memory 1104 may include a read-only memory and a random access memory, and provide an instruction and data to the processor 1103. A part of the memory 1104 may further include a nonvolatile random access memory (NVRAM). The memory 1104 stores an operating system and operating instructions, and an executable module or a data structure, or a subset or an extended set thereof, where the operating instructions may include various operating instructions and are used to implement various operations. The operating system may include various system programs, which are used to implement various basic services and process a hardware-based task.

The processor 1103 controls operations of the network device. The processor 1103 may also be referred to as a central processing unit (CPU). In a specific application, components of the network device are coupled together by using a bus system. In addition to a data bus, the bus system may further include a power bus, a control bus, a status signal bus, and the like. However, for clear description, various buses are marked as the bus system in the figure.

The method disclosed in the foregoing embodiments of this application may be applied to the processor 1103, or implemented by the processor 1103. The processor 1103 may be an integrated circuit chip and has a signal processing capability. In an implementation process, the steps of the method may be implemented by integrated logical circuits of hardware in the processor 1103 or by instructions of software. The foregoing processor 1103 may be a general-purpose processor, a digital signal processor (DSP), an application-specific integrated circuit (ASIC), a field-programmable gate array (FPGA) or another programmable logical device, a discrete gate or a transistor logical device, or a discrete hardware assembly. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1104, and the processor 1103 reads information in the memory 1104 and completes the steps in the foregoing methods in combination with hardware of the processor.

The receiver 1101 may be configured to receive input digital or character information, and generate a signal input related to a related setting and functional control of the network device. The transmitter 1102 may include a display device, for example, a display screen, and may be configured to output digital or character information by using an external interface.

In this embodiment of this application, the processor 1103 is configured to perform the reference signal processing method performed on a network device side in the foregoing embodiments.

Figure 12:
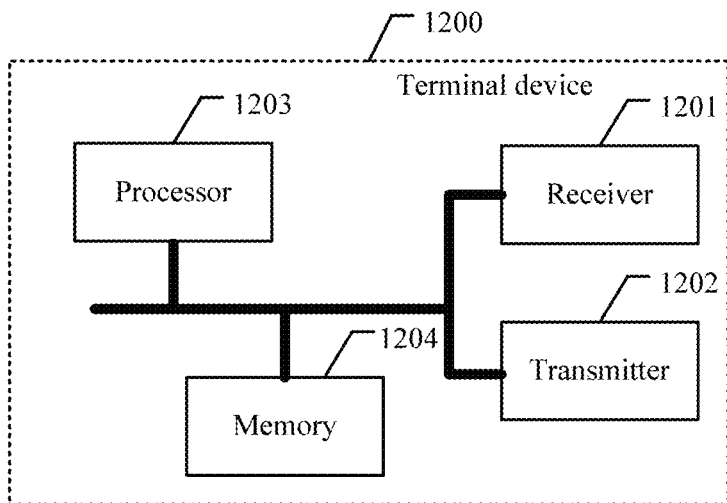
FIG. 12 is a schematic structural diagram of another terminal device according to an embodiment of this application.

Another terminal device provided in the embodiments of this application is described below. As shown in FIG. 12, the terminal device 1200 includes: a receiver 1201, a transmitter 1202, a processor 1203, and a memory 1204 (where there may be one or more processors 1203 in the terminal device 1200, and one processor is used as an example in FIG. 12). In some embodiments of this application, the receiver 1201, the transmitter 1202, the processor 1203, and the memory 1204 may be connected with each other.

The memory 1204 may include a read-only memory and a random access memory, and provide an instruction and data to the processor 1203. A part of the memory 1204 may further include an NVRAM. The memory 1204 stores an operating system and operating instructions, and an executable module or a data structure, or a subset or an extended set thereof, where the operating instructions may include various operating instructions and are used to implement various operations. The operating system may include various system programs, which are used to implement various basic services and process a hardware-based task.

The processor 1203 controls operations of the terminal device, and the processor 1203 may also be referred to as a CPU. In a specific application, components of the terminal device are coupled together by using a bus system. In addition to a data bus, the bus system may further include a power bus, a control bus, a status signal bus, and the like. However, for clear description, various buses are marked as the bus system in the figure.

The method disclosed in the foregoing embodiments of this application may be applied to the processor 1203, or implemented by the processor 1203. The processor 1203 may be an integrated circuit chip and has a signal processing capability. In an implementation process, steps in the foregoing methods can be implemented by using a hardware integrated logical circuit in the processor 1203, or by using instructions in a form of software. The processor 1203 may be a general-purpose processor, a DSP, an ASIC, an FPGA or another programmable logical device, a discrete gate or a transistor logical device, or a discrete hardware assembly. It may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1204, and a processor 1203 reads information in the memory 1204 and completes the steps in the foregoing methods in combination with hardware of the processor.

In this embodiment of this application, the processor 1203 is configured to perform the foregoing method performed on a terminal device side.

In another possible design, when the apparatus is a chip in a terminal, the chip includes a processing unit and a communications unit, where the processing unit may be, for example, a processor, and the communications unit may be, for example, an input/output interface, a pin, or a circuit. The processing unit may execute a computer executable instruction stored in a storage unit, to enable the chip in the terminal to perform the reference signal processing method according to any one of the possible designs. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

Any one of the foregoing mentioned processors may be a general-purpose central processing unit (CPU), a microprocessor, an application-specific integrated circuit (ASIC), or one or more integrated circuits configured to control program execution of the reference signal processing method.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the description of the foregoing implementations, a person skilled in the art may clearly understand that this application may be implemented by software in addition to necessary general-purpose hardware, or by special-purpose hardware, including a special-purpose integrated circuit, a special-purpose CPU, a special-purpose memory, a special-purpose component, and the like. Generally, any function that can be performed by a computer program can be easily implemented by using corresponding hardware. In addition, a specific hardware structure used to achieve a same function may be of various forms, for example, in a form of an analog circuit, a digital circuit, a special-purpose circuit, or the like. However, as for this application, software program implementation is a better implementation in most cases. Based on such an understanding, the technical solutions of this application essentially or the part contributing to the current system may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes a plurality of instructions for instructing a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method applied for a terminal device, comprising:
   obtaining gap configuration information, reference signal configuration information, and bandwidth part (BWP) configuration information, wherein the reference signal configuration information is different from the BWP configuration information, wherein the gap configuration information comprises period information of a first gap and offset information of the first gap, wherein the first gap is configured to be associated with some reference signals, wherein the reference signal configuration information is for a reference signal, and wherein the BWP configuration information is for at least one BWP configured for the terminal device;

determining whether the reference signal belongs to the some reference signals associated with the first gap;

in response to determination that the reference signal belongs to the some reference signals associated with the first gap:

after the obtaining the gap configuration information, the reference signal configuration information, and the BWP configuration information, determining whether a frequency domain location of the reference signal and an active BWP meet a first predetermined condition, wherein the active BWP is in the at least one BWP; and in response to determination that the frequency domain location of the reference signal and the active BWP meet the first predetermined condition, performing measurement of the reference signal without the first gap, or in response to determination that the frequency domain location of the reference signal and the active BWP do not meet the first predetermined condition, performing measurement of the reference signal with the first gap in a duration of the first gap, wherein the duration of the first gap is determined based on the period information of the first gap and the offset information of the first gap, wherein the first predetermined condition comprises:

that the frequency domain location of the reference signal is within the active BWP, that center frequencies of the active BWP and the reference signal are the same, and that subcarrier spacings of the active BWP and the reference signal are the same.

2. The method according to claim 1, wherein the reference signal configuration information comprises at least one of: a type parameter of the reference signal, a period parameter of the reference signal, or a frequency domain location parameter of the reference signal, the type parameter of the reference signal indicates the reference signal is a synchronization signal (SS) or a channel state information reference signal (CSI-RS), the period parameter of the reference signal indicates a sending period of the reference signal, and the frequency domain location parameter of the reference signal indicates the frequency domain location at which the reference signal is sent to the terminal device.

3. The method according to claim 1, wherein the BWP configuration information comprises: frequency information of the at least one BWP, bandwidth information of the at least one BWP, or a correspondence between the reference signal and the at least one BWP.

4. The method according to claim 1, further comprising:

determining the duration of the first gap based on a start time of the first gap and a length of the first gap, wherein the start time of the first gap is determined according to a start frame number of the first gap and a start subframe number of the first gap, and the start frame number of the first gap and the start subframe number of the first gap are calculated according to:

SFN1 mod T1=FLOOR(gapOffset/10), and

Subframe1=gapOffset mod $_{10}$, wherein SFN1 represents the start frame number of the first gap, T1 represents a period of the first gap indicated by the period information, gapOffset represents an offset of the first gap indicated by the offset information, FLOOR() represents a round-down operation, and mod represents a modulo operation; and wherein Subframe1 represents the start subframe number of the first gap.

5. The method according to claim 4, wherein the length of the first gap is configured by a network device for the terminal device.

6. The method according to claim 1, wherein the gap configuration information further comprises frequency information associated with the first gap, and wherein the frequency information indicates the terminal device to measure, in the first gap, a target reference signal associated with the frequency information.

7. An apparatus applied for a terminal device, comprising:

at least one processor; and a non-transitory computer-readable medium including computer-executable instructions that, when executed by the at least one processor, cause the apparatus to perform operations including:

obtaining gap configuration information, reference signal configuration information, and bandwidth part (BWP) configuration information, wherein the reference signal configuration information is different from the BWP configuration information, wherein the gap configuration information comprises period information of a first gap and offset information of the first gap, wherein the first gap is configured to be associated with some reference signals, wherein the reference signal configuration information is for a reference signal, and wherein the BWP configuration information is for at least one BWP configured for the terminal device;

determining whether the reference signal belongs to the some reference signals associated with the first gap;

in response to determination that the reference signal belongs to the some reference signals associated with the first gap:

after the obtaining the gap configuration information, the reference signal configuration information, and the BWP configuration information, determining whether a frequency domain location of the reference signal and an active BWP meet a first predetermined condition, wherein the active BWP is in the at least one BWP; and in response to determination that the frequency domain location of the reference signal and the active BWP meet the first predetermined condition, performing measurement of the reference signal without the first gap, or in response to determination that the frequency domain location of the reference signal and the active BWP do not meet the first predetermined condition, performing measurement of the reference signal with the first gap in a duration of the first gap, wherein the duration of the first gap is determined based on the period information of the first gap and the offset information of the first gap, wherein the first predetermined condition comprises: that the frequency domain location of the reference signal is within the active BWP, that center frequencies of the active BWP and the reference signal are the same, and that subcarrier spacings of the active BWP and the reference signal are the same.

8. The apparatus according to claim 7, wherein the reference signal configuration information comprises at least one of: a type parameter of the reference signal, a period parameter of the reference signal, or a frequency domain location parameter of the reference signal, the type parameter of the reference signal indicates the reference signal is a synchronization signal (SS) or a channel state information reference signal (CSI-RS), the period parameter of the reference signal indicates a sending period of the reference signal, and the frequency domain location parameter of the reference signal indicates the frequency domain location at which the reference signal is sent to the terminal device.

9. The apparatus according to claim 7, wherein the BWP configuration information comprises: frequency information of the at least one BWP, bandwidth information of the at least one BWP, or a correspondence between the reference signal and the at least one BWP.

10. The apparatus according to claim 7, further comprising:

determining the duration of the first gap based on a start time of the first gap and a length of the first gap, wherein the start time of the first gap is determined according to a start frame number of the first gap and a start subframe number of the first gap, and the start frame number of the first gap and the start subframe number of the first gap are calculated according to:

SFN1 mod T1=FLOOR(gapOffset/10), and

Subframe1=gapOffset mod 10, wherein $SFN_1$ represents the start frame number of the first gap, T1 represents a period of the first gap indicated by the period information, gapOffset represents an offset of the first gap indicated by the offset information, FLOOR() represents a round-down operation, and mod represents a modulo operation; and wherein Subframe1 represents the start subframe number of the first gap.

11. The apparatus according to claim 10, wherein the length of the first gap is configured by a network device for the terminal device.

12. The apparatus according to claim 7, wherein the gap configuration information further comprises: frequency information associated with the first gap, and wherein the frequency information indicates the terminal device to measure, in the first gap, a target reference signal associated with the frequency information.

13. An apparatus applied for a network device, comprising:

at least one processor; and a non-transitory computer-readable medium including computer-executable instructions that, when executed by the at least one processor, cause the apparatus to perform operations including:

sending gap configuration information, reference signal configuration information, and BWP configuration information to a terminal device, wherein the reference signal configuration information is different from the BWP configuration information, wherein the gap configuration information comprises period information of a first gap and offset information of the first gap, wherein the first gap is configured to be associated with some reference signals, wherein the period information of the first gap and the offset information of the first gap are used for determining a duration of the first gap, the reference signal configuration information is for a reference signal, and wherein the BWP configuration information is for at least one BWP configured for the terminal device;

determining whether the reference signal belongs to the some reference signals associated with the first gap;

in response to determination that the reference signal belongs to the some reference signals associated with the first gap:

after the sending the gap configuration information, the reference signal configuration information, and the BWP configuration information, determining whether a frequency domain location of the reference signal and an active BWP meet a first predetermined condition, wherein the active BWP is in the at least one BWP; and in response to determination that the frequency domain location of the reference signal and the active BWP meet the first predetermined condition, determining that the terminal device to perform measurement of the reference signal without the first gap, or in response to determination that the frequency domain location of the reference signal and the active BWP do not meet the first predetermined condition, performing measurement of the reference signal with the first gap in the duration of the first gap, wherein the first predetermined condition comprises: that the frequency domain location of the reference signal is within the active BWP, that center frequencies of the active BWP and the reference signal are the same, and that subcarrier spacings of the active BWP and the reference signal are the same.

14. The apparatus according to claim 13, wherein the reference signal configuration information comprises at least one of: a type parameter of the reference signal, a period parameter of the reference signal, or a frequency domain location parameter of the reference signal, the type parameter of the reference signal indicates the reference signal is a synchronization signal (SS) or a channel state information reference signal (CSI-RS), the period parameter of the reference signal indicates a sending period of the reference signal, the frequency domain location parameter of the reference signal indicates the frequency domain location at which the reference signal is sent to the terminal device.

15. The apparatus according to claim 13, wherein the BWP configuration information comprises: frequency information of the at least one BWP, bandwidth information of the at least one BWP, or a correspondence between the reference signal and the at least one BWP.

16. The apparatus according to claim 13, wherein the terminal device determines the duration of the first gap based on a start time of the first gap and a length of the first gap, wherein the start time of the first gap is determined according to a start frame number of the first gap and a start subframe number of the first gap, and the start frame number of the first gap and the start subframe number of the first gap are calculated according to:

SFN1 mod T1=FLOOR(gapOffset/10), and

Subframe1=gapOffset mod 10, wherein SFN1 represents the start frame number of the first gap, T1 represents a period of the first gap, gapOffset represents an offset of the first gap, FLOOR() represents a round-down operation, and mod represents a modulo operation; and wherein Subframe1 represents the start subframe number of the first gap.

17. A method applied for a network device, comprising:

sending gap configuration information, reference signal configuration information, and BWP configuration information to a terminal device, wherein the reference signal configuration information is different from the BWP configuration information, wherein the gap configuration information comprises period information of a first gap and offset information of the first gap, the period information of the first gap and the offset information of the first gap are used for determining a duration of the first gap, wherein the first gap is configured to be associated with some reference signals, wherein the reference signal configuration information is for a reference signal, and wherein the BWP configuration information is for at least one BWP configured for the terminal device;

determining whether the reference signal belongs to the some reference signals associated with the first gap;

in response to determination that the reference signal belongs to the some reference signals associated with the first gap:

after the sending the gap configuration information, the reference signal configuration information, and the BWP configuration information, determining whether a frequency domain location of the reference signal and an active BWP meet a first predetermined condition, wherein the active BWP is in the at least one BWP; and in response to determination that the frequency domain location of the reference signal and the active BWP meet the first predetermined condition, determining that the terminal device to perform measurement of the reference signal without the first gap, or in response to determination that the frequency domain location of the reference signal and the active BWP do not meet the first predetermined condition, performing measurement of the reference signal with the first gap in the duration of the first gap, wherein the first predetermined condition comprises: that the frequency domain location of the reference signal is within the active BWP, that center frequencies of the active BWP and the reference signal are the same, and that subcarrier spacings of the active BWP and the reference signal are the same.

18. The method according to claim 17, wherein the reference signal configuration information comprises at least one of: a type parameter of the reference signal, a period parameter of the reference signal, or a frequency domain location parameter of the reference signal, wherein the type parameter of the reference signal indicates the reference signal is an SS or a CSI-RS, the period parameter of the reference signal indicates a sending period of the reference signal, the frequency domain location parameter of the reference signal indicates the frequency domain location at which the reference signal is sent to the terminal device.

19. The method according to claim 17, wherein the BWP configuration information comprises: frequency information of the at least one BWP, bandwidth information of the at least one BWP, or a correspondence between the reference signal and the at least one BWP.

20. The method according to claim 17, wherein the terminal device determines the duration of the first gap based on a start time of the first gap and a length of the first gap, wherein the start time of the first gap is determined according to a start frame number of the first gap and a start subframe number of the first gap, and the start frame number of the first gap and the start subframe number of the first gap are calculated according to:

SFN1 mod $T_1$=FLOOR(gapOffset/10), and

Subframe1=gapOffset mod 10, wherein SFN1 represents the start frame number of the first gap, T1 represents a period of the first gap, gapOffset represents an offset of the first gap, FLOOR() represents a round-down operation, and mod represents a modulo operation; and wherein Subframe1 represents the start subframe number of the first gap.

\* \* \* \* \*